United States Patent
Lu et al.

(10) Patent No.: US 12,346,096 B2
(45) Date of Patent: Jul. 1, 2025

(54) CONTROL PROGRAM GENERATION APPARATUS, CONTROL PROGRAM GENERATION METHOD, AND PROGRAM

(71) Applicant: OPTON Co. LTD., Aichi (JP)

(72) Inventors: Haining Lu, Aichi (JP); Toshihiro Kani, Aichi (JP); Hidenori Ozaki, Aichi (JP); Teruaki Yogo, Aichi (JP)

(73) Assignee: OPTON Co. LTD., Aichi (JP)

( * ) Notice: Subject to any disclaimer, the term of this patent is extended or adjusted under 35 U.S.C. 154(b) by 441 days.

(21) Appl. No.: 18/088,847

(22) Filed: Dec. 27, 2022

(65) Prior Publication Data
US 2023/0229140 A1    Jul. 20, 2023

(30) Foreign Application Priority Data

Jan. 17, 2022  (JP) ................. 2022-004975
Nov. 8, 2022   (JP) ................. 2022-178890

(51) Int. Cl.
*G05B 19/4155*   (2006.01)
*G06Q 50/04*     (2012.01)

(52) U.S. Cl.
CPC ......... *G05B 19/4155* (2013.01); *G06Q 50/04* (2013.01); *G05B 2219/31372* (2013.01)

(58) Field of Classification Search
None
See application file for complete search history.

(56) References Cited

U.S. PATENT DOCUMENTS

2015/0300798 A1* 10/2015 Pettersson ............ G05B 19/401
                                                    33/503
2021/0107102 A1*  4/2021 Yamaguchi ...... G05B 19/41865

FOREIGN PATENT DOCUMENTS

JP           6829505 B1    2/2021

* cited by examiner

*Primary Examiner* — Mohammad Ali
*Assistant Examiner* — Saad M Kabir
(74) *Attorney, Agent, or Firm* — Nakanishi IP Associates, LLC

(57) ABSTRACT

A control program is automatically created using an action chart that is easy to create for an automated manufacturing machine with a complex operation. A subchart is pre-created for a set of consecutive subperiods of multiple subperiods included in an action chart. The action chart includes a subchart representation in a subperiod for identifying the subchart to represent the set of consecutive subperiods corresponding to the subchart. The action chart and the subchart are read together. Program elements for element actions in the subperiods on the action chart are combined together. For the subperiod with the subchart representation on the action chart, program elements for element actions assigned to the consecutive subperiods on the subchart are combined together in an order of the consecutive subperiods on the subchart. The control program is thus generated.

6 Claims, 27 Drawing Sheets

FIG. 4

| Element action | Type of motion | Structure | Program element |
|---|---|---|---|
| act1 | Rotation motion | AC servomotor + reducer | prog1 |
| act2 | Forward or backward motion | AC servomotor + converter | prog2 |
| act3 | Forward or backward motion | Linear servomotor | prog3 |
| act4 | Rotation motion | AC servomotor + reducer | prog1 |
| act5 | Rotation motion | AC servomotor + reducer | prog1 |
| act6 | Forward or backward motion | AC servomotor + converter | prog2 |
| act7 | Forward or backward motion | AC servomotor + converter | prog2 |
| act8 | Rotation motion | AC servomotor + reducer | prog1 |
| act9 | Forward or backward motion | Linear servomotor | prog3 |

FIG. 5

| Type of motion | Structure | Action identifier | Program element number |
|---|---|---|---|
| Forward or backward motion | AC servomotor + converter | CNC-XA | 1 |
| | Linear servomotor | CNC-XL | 2 |
| | Air cylinder | AC | 3 |
| | Hydraulic cylinder | OC | 4 |
| Rotation motion | AC servomotor + reducer | CNC-$\theta$A | 5 |
| | AC servomotor + reducer | OPN-$\theta$P | 6 |

FIG. 7A  Actuator A

| Parameter identifier | Details | Parameter value |
|---|---|---|
| AA-pos1 | Movement distance | 50 (mm) |
| AA-spd1 | Movement speed | 10 (mm/s) |
| AA-trq1 | Movement torque | 100 (%) |
| AA-pos2 | Movement distance | 150 (mm) |
| AA-spd2 | Movement speed | 15 (mm/s) |

FIG. 7B  Actuator B

| Parameter identifier | Details | Parameter value |
|---|---|---|
| AB-pos1 | Rotation angle | 90 (°) |
| AB-spd1 | Rotation speed | 15 (°/s) |
| AB-trq1 | Rotation torque | 100 (%) |
| AB-pos2 | Rotation angle | 30 (°) |
| AB-spd2 | Rotation speed | 10 (°/s) |

FIG. 7C  Actuator C

| Parameter identifier | Details | Parameter value |
|---|---|---|
| AC-pos1 | Movement distance | 30 (mm) |
| AC-spd1 | Movement speed | 20 (mm/s) |
| AC-trq1 | Movement torque | 100 (%) |
| AC-pos2 | Movement distance | 25 (mm) |
| AC-spd2 | Movement speed | 15 (mm/s) |

FIG. 7D  Actuator D

| Parameter identifier | Details | Parameter value |
|---|---|---|
| AD-pos1 | Movement distance | 60 (mm) |
| AD-spd1 | Movement speed | 25 (mm/s) |
| AD-trq1 | Movement torque | 100 (%) |
| AD-pos2 | Movement distance | 150 (mm) |
| AD-spd2 | Movement speed | 25 (mm/s) |

FIG. 7E  Actuator E

| Parameter identifier | Details | Parameter value |
|---|---|---|
| AE-pos1 | Movement distance | 150 (mm) |
| AE-spd1 | Movement speed | 35 (mm/s) |
| AE-trq1 | Movement torque | 100 (%) |

FIG. 8B  Table for coordinates (1, 1)

| Table identifier | TABL1-1 | |
|---|---|---|
| Parameter name | Details | Parameter value |
| AA-pos1 | Movement distance | 50 (mm) |
| AA-spd1 | Movement speed | 10 (mm/s) |
| AA-trq1 | Movement torque | 100 (%) |

FIG. 8C  Table for coordinates (2, 2)

| Table identifier | TABL2-2 | |
|---|---|---|
| Parameter name | Details | Parameter value |
| AB-pos1 | Rotation angle | 90 (°) |
| AB-spd1 | Rotation speed | 15 (°/s) |
| AB-trq1 | Rotation torque | 100 (%) |

FIG. 12A

Chart coordinates
(4, 1)

☆CNC-XA  ← 206a
★BO-CA03 ⇐ 
★BO-CA04 ⇐ 206b  } 206
★BO-CA05 ⇐

FIG. 12B

Chart coordinates
(1, 2)

☆CNC-XA
★CH-OC01
★CH-OC02
★CH-OC03

FIG. 12C

Chart coordinates
(4, 3)

☆CNC-XA
★BO-CA06
★BO-CA07
★BO-CA05

FIG. 12D

Chart coordinates
(8, 4)

☆CNC-XL
★KL-KX01
★XY-AA02
★XY-AA03

FIG. 12E

Chart coordinates
(10, 5)

☆CNC-XA
★CL-SE04
★CL-SE02
★CL-SE07

FIG. 12F

Chart coordinates
(3, 6)

☆CNC-XA
★CH-RL01
★CH-RL02
★CH-RL03

FIG. 12G

Chart coordinates
(7, 7)

☆CNC-XA
★PR-SE03
★PR-SE01
★PR-SE07

FIG. 12H

Chart coordinates
(10, 7)

☆CNC-XA
★CL-SE03
★CL-SE01
★CL-SE07

FIG. 12I

Chart coordinates
(4, 8)

☆CNC-XA
★BO-CA08
★BO-CA09
★BO-CA10

FIG. 12J

Chart coordinates
(5, 8)

☆CNC-XL
★CN-XA01
★CN-XA03
★CN-XA02

FIG. 12K

Chart coordinates
(6, 8)

☆CNC-XL
★CN-XB05
★CN-XB07
★CN-XB06

FIG. 12L

Chart coordinates
(9, 8)

☆CNC-$\theta$A
★BA-AA01
★BS-AA02
★BT-AA03

FIG. 12M

Chart coordinates
(7, 9)

☆CNC-XA
★PR-SE05
★PR-SE06
★PR-SE07

FIG. 12N

Chart coordinates
(10, 9)

☆CNC-XA
★CL-SE06
★CL-SE02
★CL-SE07

FIG. 12O

Chart coordinates
(5, 10)

☆CNC-XL
★CN-XA05
★CN-XA06
★CN-XA07

```
                    M   N    206a         206b
                    ↓   ↓     ↓            ↓              Intermediate data
              1 :  ( 4,  1, CNC-XA, BO-CA03, BO-CA04, BO-CA05) ,
              2 :  ( 1,  2, CNC-XA, CH-OC01, CH-OC02, CH-OC03) ,
              3 :  ( 4,  3, CNC-XA, BO-CA06, BO-CA07, BO-CA05) ,
              4 :  ( 8,  4, CNC-XL, KL-KX01, XY-AA02, XY-AA03) ,
              5 :  (10,  5, CNC-XA, CL-SE04, CL-SE02, CL-SE07) ,
              6 :  ( 3,  6, CNC-XA, CH-RL01, CH-RL02, CH-RL03) ,
              7 :  ( 7,  7, CNC-XA, PR-SE03, PR-SE01, PR-SE07) ,
                   (10,  7, CNC-XA, CL-SE03, CL-SE01, CL-SE07) ,
              8 :  ( 4,  8, CNC-XA, BO-CA08, BO-CA09, BO-CA10) ,
                   ( 5,  8, CNC-XL, CN-XA01, CN-XA03, CN-XA02) ,
                   ( 6,  8, CNC-XL, CN-XA05, CN-XA07, CN-XA06) ,
                   ( 9,  8, CNC-θA, BA-AA01, BS-AA02, BT-AA03) ,
              9 :  ( 7,  9, CNC-XA, PR-SE05, PR-SE06, PR-SE07) ,
                   (10,  9, CNC-XL, CL-SE06, CL-SE02, CL-SE07) ,
                                 ⋮
```

FIG. 22

```
                   M  N  P   V
                   ↓  ↓  ↓   ↓              Control program
              1 : ( 4, 1, 1,  25, 120, 100),
              2 : ( 1, 2, 1,  60,  20, 100),
              3 : ( 4, 3, 1, 150,  55, 100),
              4 : ( 8, 4, 2,  10,  35, 100),
              5 : (10, 5, 1,  50, 120, 100),
              6 : ( 3, 6, 1,  20,  50, 100),
              7 : ( 7, 7, 1,  60, 150, 100),
                  (10, 7, 1,  55,  85, 100),
              8 : ( 4, 8, 1,  15,  50, 100),
                  ( 5, 8, 2,  90, 170, 100),
                  ( 6, 8, 2, 200,  35, 100),
                  ( 9, 8, 5,  35,  60, 100),
              9 : ( 7, 9, 1,  14, 250, 100),
                  (10, 9, 2,  35,  65, 100),
                              ⋮
```

FIG. 24A
Chart coordinates (8, 1)

☆CNC-XL ← 206a
★KL-KR-X ← 206d ⎫
★XY-AA02 ← ⎬ 206
★XY-AA03 ← 206b ⎭

FIG. 24B
Chart coordinates (10, 2)

☆CNC-XA
★CL-SP-X
★CL-SE02
★CL-SE07

FIG. 24C
Chart coordinates (3, 3)

☆CNC-XA
★CH-RL-X
★CH-RL02
★CH-RL03

FIG. 24D
Chart coordinates (7, 4)

☆CNC-XA
★PR-MC-X
★PR-SE01
★PR-SE07

FIG. 24E
Chart coordinates (10, 4)

☆CNC-XA
★CL-MP-X
★CL-SE01
★CL-SE07

FIG. 24F
Chart coordinates (4, 5)

☆CNC-XA
★BO-CA-X
★BO-CA09
★BO-CA10

FIG. 24G
Chart coordinates (5, 5)

☆CNC-XL
★CN-XA-X
★CN-XA03
★CN-XA02

FIG. 24H
Chart coordinates (6, 5)

☆CNC-XL
★CN-XB-X
★CN-XB07
★CN-XB06

FIG. 24I
Chart coordinates (9, 5)

☆CNC-θA
★BA-AA-X
★BS-AA02
★BT-AA03

FIG. 24J
Chart coordinates (7, 6)

☆CNC-XA
★PR-RC-X
★PR-SE06
★PR-SE07

FIG. 24K
Chart coordinates (10, 6)

☆CNC-XA
★CL-RP-X
★CL-SE02
★CL-SE07

FIG. 24L
Chart coordinates (5, 7)

☆CNC-XL
★CN-XC-X
★CN-XA06
★CN-XA02

FIG. 24M
Chart coordinates (6, 7)

☆CNC-XL
★CN-XD-X
★CN-XB08
★CN-XB06

FIG. 24N
Chart coordinates (9, 7)

☆CNC-θA
★BA-AB-X
★BS-AB02
★BT-AB03

FIG. 25

| Parameter identifier | Parameter value | | | | Notes (description) |
|---|---|---|---|---|---|
| | 1st | 2nd | 3rd | 4th | |
| KL-KR-X | 1 | 2 | 1 | 1 | Select bend die |
| CL-SP-X | 18 | 10 | 18 | 18 | Move clamp die (preclamping) |
| CH-RL-X | 22 | 13 | 22 | 22 | Move chuck (close-contact placement) |
| PR-MC-X | 22 | 13 | 22 | 22 | Move pressure die (main clamping) |
| CL-MP-X | 4 | 3 | 4 | 4 | Move clamp die (main clamping) |
| BO-CA-X | 5 | 9 | 5 | 3 | Move chuck forward (bending) |
| CN-XA-X | 250 | 330 | 250 | 210 | Loosen cables (bending) |
| CN-XB-X | 260 | 340 | 260 | 220 | |
| BA-AA-X | 60 | 90 | 60 | 30 | Move clamp die (bending) |
| PR-RC-X | -22 | -13 | -22 | -22 | Move pressure die (die release) |
| CL-RP-X | -22 | -13 | -22 | -22 | Move clamp die (die release) |
| CN-XC-X | -250 | -330 | -250 | -210 | Tighten cables (die return) |
| CN-XD-X | -260 | -340 | -260 | -220 | |
| BA-AB-X | -60 | -90 | -60 | -30 | Move clamp die (die return) |

FIG. 26A
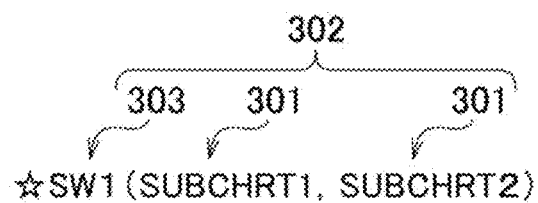
FIG. 26B
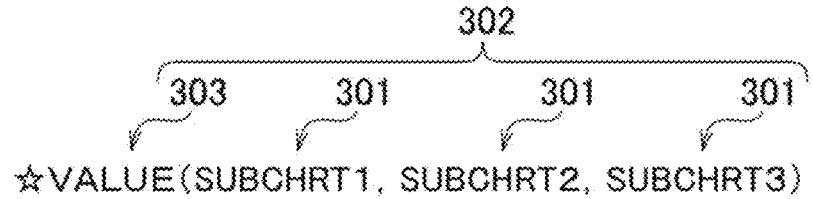
FIG. 26C
☆VALUE(SUBCHRT1, SUBCHRT2, SUBCHRT3)
FIG. 26D
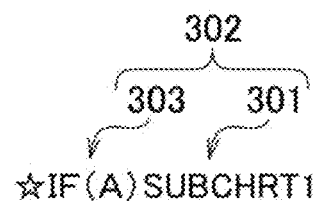

FIG. 27A
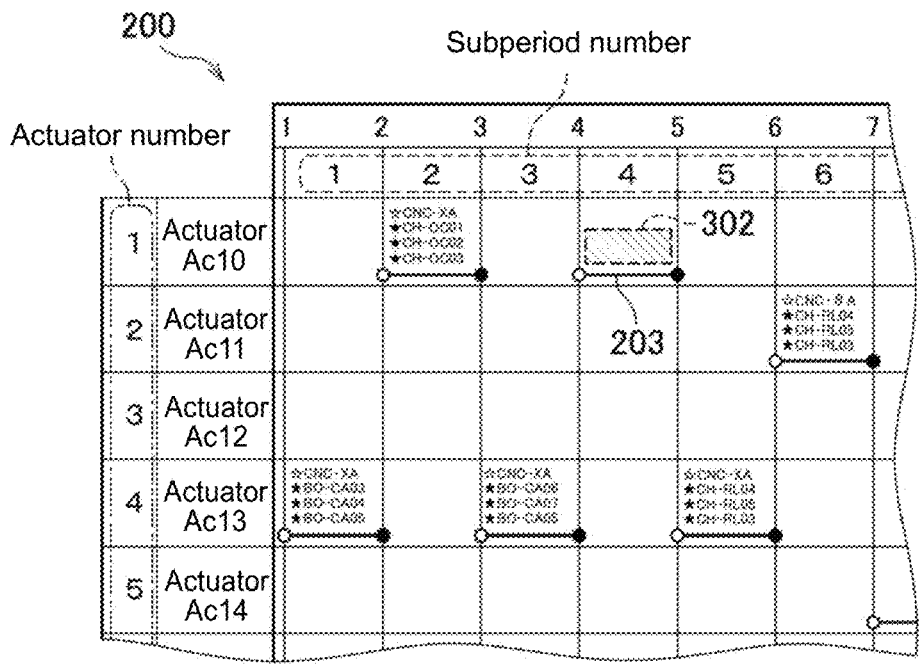
FIG. 27B
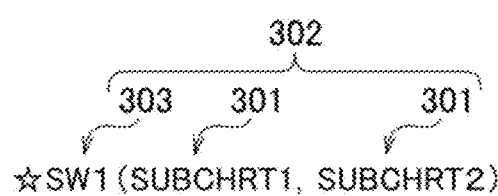
☆SW1(SUBCHRT1, SUBCHRT2)
FIG. 27C
FIG. 27D

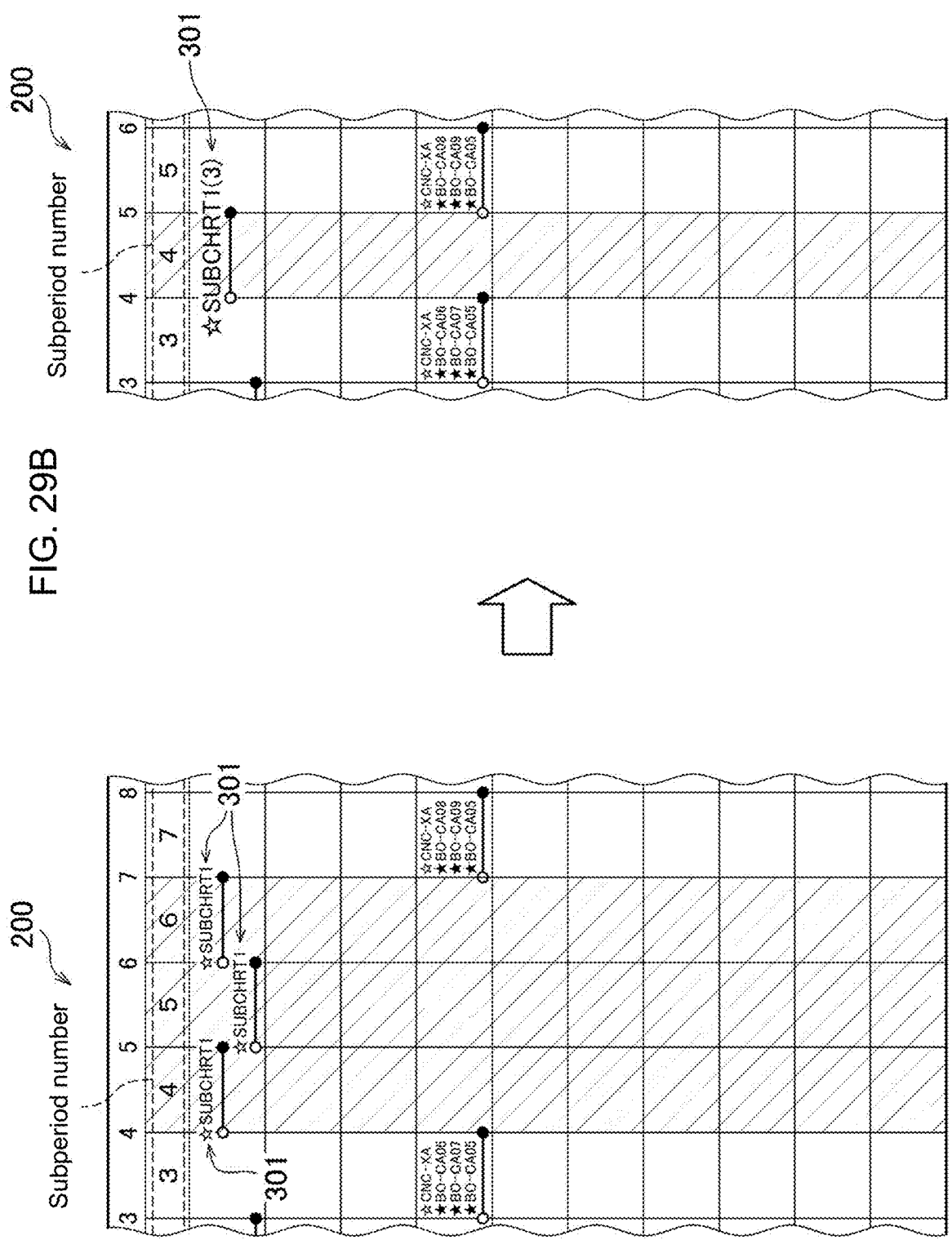

CONTROL PROGRAM GENERATION APPARATUS, CONTROL PROGRAM GENERATION METHOD, AND PROGRAM

BACKGROUND OF INVENTION

Field of the Invention

The present invention relates to a technique for automatically generating a control program for an automated manufacturing machine including multiple actuators.

Background Art

When an automated manufacturing machine including multiple actuators performs a complex operation, the individual actuators perform simple actions. The automated manufacturing machine performs a complex operation by combining simple actions (hereafter, element actions) of the individual actuators. The inventors of the present application have developed a special action chart (hereafter, a YOGO chart) describing a complex operation of the automated manufacturing machine. The action chart includes multiple subperiods into which the entire period (hereafter, an operation period) from the start to the end of the operation of the automated manufacturing machine is divided. The subperiods have actuators assigned to act and information about element actions assigned.

The YOGO chart specifically describes motions corresponding to the element actions to be performed by the actuators and indicates the action timings of the actuators to allow the automated manufacturing machine to operate as intended. The element actions of the individual actuators are simple and can be performed with program elements that can be pre-created. The YOGO chart is read by a computer to determine the program elements that cause the actuators to perform the element actions. The program elements can be combined together in an order defined by the YOGO chart. The combined program elements allow the automated manufacturing machine to operate. Based on this concept, the inventors of the present application have developed a technique for automatically generating a control program for the automated manufacturing machine from the YOGO chart, which has been patented (Patent Literature 1).

CITATION LIST

Patent Literature

Patent Literature 1: Japanese Patent No. 6829505

With the technique developed above, the YOGO chart may be more difficult to create for an automated manufacturing machine with a more complex operation. This is due to the reasons below.

First, the YOGO chart is created to include multiple subperiods into which the operation period of the automated manufacturing machine is divided, with the subperiods being assigned with the element actions of the actuators in an appropriate order, as described above. For an automated manufacturing machine with a more complex operation, the operation includes more element actions, which are simple actions of the actuators. For such an automated manufacturing machine, the operation period is divided into more subperiods as well. The YOGO chart including more subperiods may be difficult to view entirely. To create the YOGO chart, an engineer is to assign multiple element actions to subperiods in an appropriate order. For a YOGO chart that is difficult to view entirely, however, the engineer may have difficulty in checking whether the element actions are assigned in an appropriate order. Such a YOGO chart may thus be more difficult to create.

In response to the above issue with the technique developed, one or more aspects of the present invention are directed to a technique for facilitating automatic generation of a control program using the YOGO chart that is easy to create for an automated manufacturing machine with a complex operation.

SUMMARY OF INVENTION

In response to the above issue, a control program generation apparatus according to one or more aspects of the present invention is an apparatus described below. The apparatus is specifically a control program generation apparatus for generating a control program for an automated manufacturing machine including a plurality of actuators. The apparatus includes an element action storage, an action chart reader, and a control program generator. The element action storage stores a plurality of element actions in a manner associated with a plurality of program elements to perform the plurality of element actions. Each of the plurality of element actions indicates an action of a corresponding actuator of the plurality of actuators in a direction of an inherent degree of freedom of the corresponding actuator by a specified displacement. The action chart reader reads an action chart describing an operation of the automated manufacturing machine. The action chart includes a plurality of subperiods into which an operation period from a start to an end of the operation of the automated manufacturing machine is divided. The action chart includes the plurality of element actions included in the operation of the automated manufacturing machine. Each of the plurality of element actions is assigned to a subperiod of the plurality of subperiods. The control program generator generates the control program to cause the automated manufacturing machine to operate by combining together, in an order of the plurality of subperiods on the action chart, the plurality of program elements for the plurality of element actions assigned to the plurality of subperiods on the action chart. The action chart reader reads, in addition to the action chart, at least one sub chart (300) corresponding to consecutive subperiods of the plurality of subperiods assigned with element actions of the plurality of element actions. The action chart includes a subchart representation (301) assigned to at least one subperiod of the plurality of subperiods, and the subchart representation is specific to the at least one subchart. The control program generator generates, for the at least one subperiod assigned with the subchart representation, the control program by combining together, in an order of the consecutive subperiods on the at least one subchart, program elements of the plurality of program elements for the element actions assigned to the consecutive subperiods on the at least one subchart corresponding to the subchart representation.

A control program generation method according to one or more aspects of the present invention corresponding to the above control program generation apparatus is a method described below. The method is specifically a control program generation method for generating, with a computer, a control program for an automated manufacturing machine (10) including a plurality of actuators. The method includes reading (STEP 1) an action chart (200) and generating (STEP 2, STEP 3, STEP 4) the control program. The action chart (200) describes an operation of the automated manufacturing machine. The action chart includes a plurality of subperiods into which an operation period from a start to an end of the operation of the automated manufacturing machine is divided. The action chart includes a plurality of element actions included in the operation of the automated manufacturing machine. Each of the plurality of element actions indicates an action of a corresponding actuator of the plurality of actuators in a direction of an inherent degree of freedom of the corresponding actuator by a specified displacement. Each of the plurality of element actions is assigned to a subperiod of the plurality of subperiods. The generating (STEP 2, STEP 3, STEP 4) the control program includes generating (STEP 2, STEP 3, STEP 4) the control program to cause the automated manufacturing machine to operate by referring to a stored correspondence between the plurality of element actions on the action chart and a plurality of program elements to perform the plurality of element actions, by converting the plurality of element actions on the action chart into the plurality of program elements, and by combining together the plurality of program elements in an order of the plurality of subperiods. The reading the action chart includes reading, in addition to the action chart, at least one subchart (300) corresponding to consecutive subperiods of the plurality of subperiods assigned with element actions of the plurality of element actions. The read action chart includes a subchart representation (301) assigned to at least one subperiod of the plurality of subperiods, and the subchart representation is specific to the at least one subchart. The generating the control program includes generating, for the at least one subperiod assigned with the subchart representation, the control program by combining together, in an order of the consecutive subperiods on the at least one subchart, program elements of the plurality of program elements for the element actions assigned to the consecutive subperiods on the at least one subchart corresponding to the subchart representation.

In the control program generation apparatus and with the control program generation method according to the above aspects of the present invention, a subchart is pre-created for a set of consecutive subperiods of multiple subperiods included in the action chart. In the action chart, a subchart representation specific to the subchart is assigned to a subperiod to represent the set of consecutive subperiods corresponding to the subchart. The action chart and the subchart are read together. For the subperiod with the subchart representation on the action chart, program elements for element actions assigned to the consecutive subperiods on the subchart are combined together in an order of the consecutive subperiods on the subchart. The control program is thus generated from the action chart.

Thus, the single subperiod with the subchart representation can represent the consecutive subperiods on the action chart. This allows a shorter action chart. The action chart is thus easily viewable entirely and easy to create for an automated manufacturing machine with a complex operation. This facilitates generation of a control program for the automated manufacturing machine.

In the control program generation apparatus and with the control program generation method according to the above aspects of the present invention, the action chart including the subchart representation may be converted into an action chart without including the subchart representation by replacing the at least one subperiod assigned with the subchart representation with the consecutive subperiods on the at least one subchart corresponding to the subchart representation. The control program may then be generated based on the action chart resulting from the conversion.

In this case, the control program can be generated from the action chart including the subchart representation using the same process for generating the control program from the action chart without including the subchart representation. This facilitates generation of the control program.

In the control program generation apparatus according to the above aspect of the present invention, the at least one subperiod on the action chart may be assigned with a plurality of the subchart representations and a selection condition for selecting one of the plurality of subchart representations. The action chart may be converted into the control program in the manner described below. A plurality of the subcharts corresponding to the plurality of subchart representations may be read in addition to the action chart. For the at least one subperiod assigned with the plurality of subchart representations, one of the plurality of subchart representations may be selected based on the selection condition. The control program may be generated by combining together the program elements for the element actions assigned to the consecutive subperiods in accordance with one of the plurality of subcharts corresponding to the selected subchart representation. The control program may thus be generated from the action chart.

This allows generation of a complex control program that can switch actions in accordance with the condition. The subchart representation allows a simpler action chart, thus facilitating creation of the action chart.

In the control program generation apparatus according to the above aspect of the present invention, a plurality of subcontrol programs may be generated for the plurality of subcharts corresponding to the plurality of subchart representations assigned to one subperiod. Each of the plurality of subcontrol programs may be generated by combining together, in an order of the consecutive subperiods on a corresponding subchart of the plurality of subcharts, the program elements for the element actions assigned to the consecutive subperiods on the corresponding subchart. For the subperiod assigned with the plurality of subchart representations, the control program may be generated for executing a subcontrol program selected from the plurality of subcontrol programs based on the selection condition. The control program may thus be generated from the action chart.

One of the pre-created subcontrol programs may be selected for execution based on the selection condition. This allows prompt start of the subcontrol program selected in accordance with the selection condition during execution of the control program.

The above control program generation method according to one or more aspects of the present invention may also be implemented as a non-transitory computer-readable storage medium storing a program for causing a computer to perform the control program generation method. The program according to one or more aspects of the present invention is specifically a program for causing a computer to implement a method for generating a control program for an automated manufacturing machine (10) including a plurality of actuators. The method includes reading (STEP 1) an action chart (200) and generating (STEP 2, STEP 3, STEP 4) the control program. The action chart (200) describes an operation of the automated manufacturing machine. The action chart includes a plurality of subperiods into which an operation period from a start to an end of the operation of the automated manufacturing machine is divided. The action chart includes a plurality of element actions included in the operation of the automated manufacturing machine. Each of the plurality of element actions indicates an action of a corresponding actuator of the plurality of actuators in a direction of an inherent degree of freedom of the corresponding actuator by a specified displacement. Each of the plurality of element actions is assigned to a subperiod of the plurality of subperiods. The generating (STEP 2, STEP 3, STEP 4) the control program includes generating (STEP 2, STEP 3, STEP 4) the control program to cause the automated manufacturing machine to operate by referring to a stored correspondence between the plurality of element actions on the action chart and a plurality of program elements to perform the plurality of element actions, by converting the plurality of element actions on the action chart into the plurality of program elements, and by combining together the plurality of program elements in an order of the plurality of subperiods. The reading the action chart includes reading, in addition to the action chart, at least one sub chart (300) corresponding to consecutive subperiods of the plurality of subperiods assigned with element actions of the plurality of element actions. The read action chart includes a subchart representation (301) assigned to at least one subperiod of the plurality of subperiods, and the subchart representation is specific to the at least one subchart. The generating the control program includes generating, for the at least one subperiod assigned with the subchart representation, the control program by combining together, in an order of the consecutive subperiods on the at least one subchart, program elements of the plurality of program elements for the element actions assigned to the consecutive subperiods on the at least one subchart corresponding to the subchart representation.

The program can be loaded and executed by the computer. This allows automatic generation of the control program using the action chart that is easy to create for an automated manufacturing machine with a complex operation.

BRIEF DESCRIPTION OF THE DRAWINGS

FIG. 4 is a table including multiple element actions used for the YOGO chart in FIGS. 3A and 3B.

FIG. 5 is a table including classified multiple element actions usable for the YOGO chart.

FIGS. 7A, 7B, 7C, 7D, and 7E are example tables each including parameter values defined for parameter identifiers 206*b* written on the YOGO chart 200.

FIGS. 8A, 8B, and 8C are a chart and tables showing an example manner of writing element actions 206 on the YOGO chart 200 using table identifiers 206*c*.

FIGS. 12A, 12B, 12C, 12D, 12E, 12F, 12G, 12H, 12I, 12J, 12K, 12L, 12M, 12N, and 12O are example diagrams showing some of the element actions 206 written on the YOGO chart 200 in FIGS. 10 and 11.

FIGS. 14A and 14B are diagrams showing a subchart 300.

FIG. 21 is a diagram of example intermediate data generated from the YOGO chart 200 through the YOGO chart analysis process.

FIG. 22 is a diagram of an example control program resulting from conversion of the intermediate data.

FIGS. 24A, 24B, 24C, 24D, 24E, 24F, 24G, 24H, 24I, 24J, 24K, 24L, 24M, and 24N are example diagrams showing the element actions 206 written on the subchart 300 in the first modification.

FIG. 25 is an example table including multiple parameter values V defined for parameter identifiers 206*d* in the first modification.

FIGS. 26A, 26B, 26C, and 26D are diagrams showing a conditional subchart representation 302 on a YOGO chart 200 in a second modification.

FIGS. 27A, 27B, 27C, and 27D are an example YOGO chart 200 in the second modification including the conditional subchart representation 302, and two example subcharts 300 indicated by the conditional subchart representation 302.

FIGS. 29A and 29B are example diagrams describing the subchart identifier 301 specifying the number of repetitions of operation.

DETAILED DESCRIPTION

A. Apparatus Structure

Figure 1:
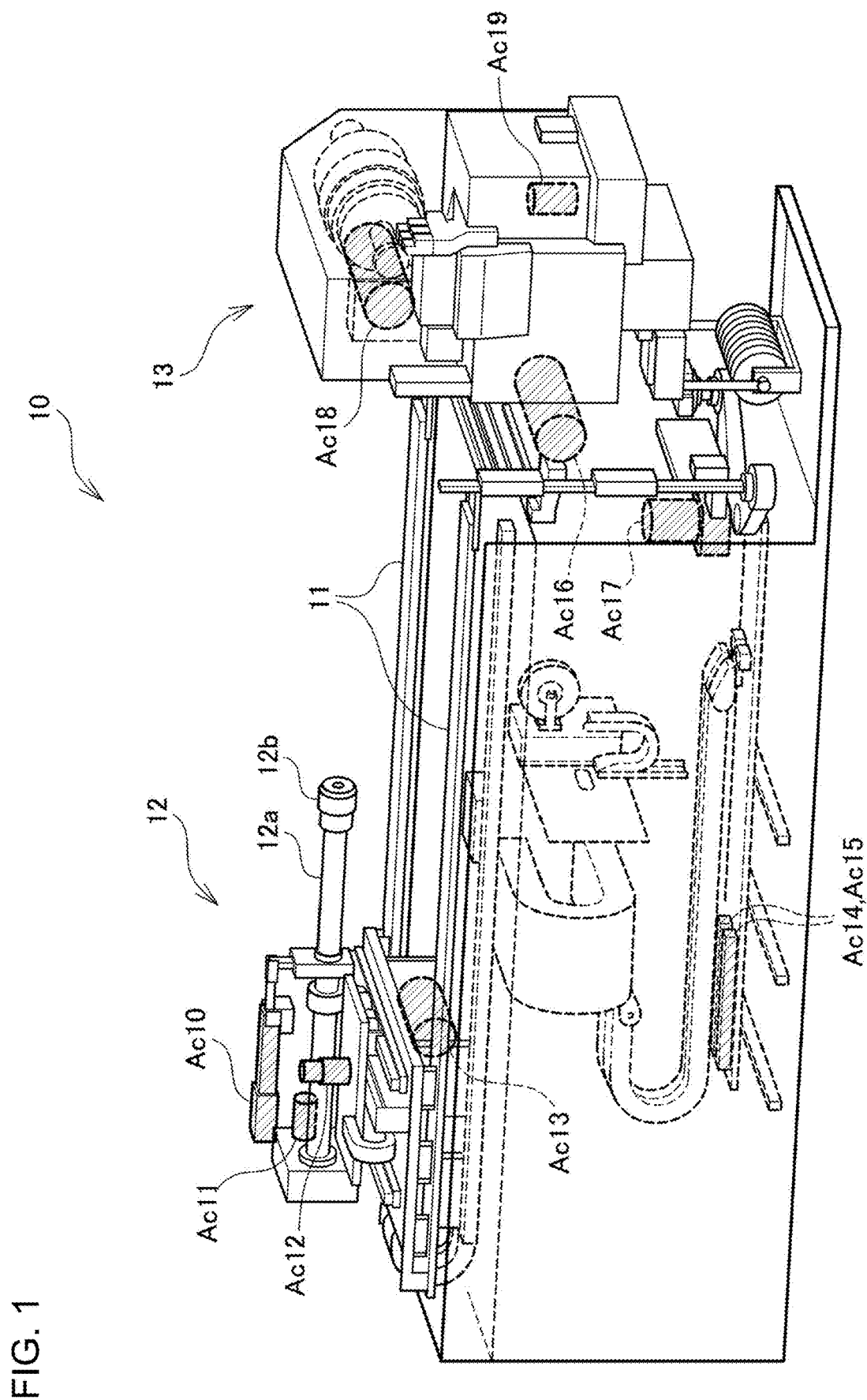
FIG. 1 is a schematic view of a pipe bender 10 controllable with a control apparatus 100 according to an embodiment.

FIG. 1 is a schematic external view of the pipe bender 10 in the present embodiment. The pipe bender 10 is an automated manufacturing machine for automatically bending a long pipe into an intended shape. The automated manufacturing machine may be other than the pipe bender 10 in the present embodiment and may be any machine that includes multiple actuators and automatically performs multiple operations such as holding, conveying, machining, or heating objects. The automated manufacturing machine may be, for example, a multijoint robotic arm, or may be a manufacturing system combining a multijoint robotic arm and a conveyor.

As shown in FIG. 1, the pipe bender 10 in the present embodiment is externally in the shape of a substantially horizontal rectangular prism. The pipe bender 10 includes two rails 11 extending lengthwise over the upper surface of the rectangular prism. The pipe bender 10 includes a conveyor unit 12 for holding and conveying a pipe to be machined (not shown) at one end (left in FIG. 1) of the rails 11. The pipe bender 10 includes a machining unit 13 at the end opposite to the conveyor unit 12. The machining unit 13 is used for bending a pipe (not shown). The conveyor unit 12 includes a protruding cylindrical holder shaft 12a with a chuck 12b attached to its distal end for holding a pipe (not shown). The conveyor unit 12 is moved on the rails 11 with the chuck 12b holding the pipe to supply the pipe to the machining unit 13, which can then bend the pipe.

The pipe bender 10 in the present embodiment can control the movement distance of the conveyor unit 12 and thus the conveying distance of the pipe. The position on the pipe to be bent can thus be changed as appropriate. The holder shaft 12a with the chuck 12b can be turned (twisted) about its axis to bend the pipe in an intended direction. To achieve these operations, the pipe bender 10 includes actuators Ac10, Ac11, Ac12, and Ac13 inside the conveyor unit 12. The actuator Ac10 is for opening or closing the chuck 12b. The actuator Ac11 is for rotating the holder shaft 12a about the axis. The actuator Ac12 is for translating the holder shaft 12a horizontally relative to the axial direction. The actuator Ac13 is for moving the conveyor unit 12 forward or backward on the rails 11. In the pipe bender 10 in the present embodiment, the actuators Ac10 to Ac13 are all alternating current (AC) servomotors operable on AC power. However, the pipe bender 10 may include actuators with other driving schemes (e.g., hydraulic cylinders, solenoids, or pulse motors) as appropriate for the intended performance of the actuators. The conveyor unit 12 also includes sensors such as encoders and limit switches for detecting the rotational position of the holder shaft 12a and the movement position of the conveyor unit 12. Such sensors are not shown in FIG. 1 to avoid complexity in the figure.

The pipe bender 10 includes multiple actuators Ac16, Ac17, Ac18, and Ac19 for bending the pipe inside the machining unit 13. The pipe bender 10 also includes two actuators Ac14 and Ac15 in a space below the two rails 11. The actions of the actuators Ac14 to Ac19 will be described in detail later. The pipe bender 10 also includes switches and sensors such as contact switches and encoders inside the machining unit 13 or in the space below the two rails 11. The switches and sensors are not shown to avoid complexity in the figure.

The pipe bender 10 also includes, inside the machining unit 13, multiple driver amplifiers (not shown) for driving the above actuators Ac10 to Ac19. The driver amplifiers are electrical components with the functions below. To act as intended, the actuators Ac10 to Ac19 are to receive drive currents with appropriate waveforms and voltages. The drive currents to be supplied to the actuators Ac10 to Ac19 differ depending on their driving schemes. Actuators with the same driving scheme may have drive currents with different waveforms and voltages. The pipe bender 10 thus includes electrical components, or driver amplifiers, designed specifically for the actuators Ac10 to Ac19. The driver amplifiers output appropriate drive currents to the actuators Ac10 to Ac19 for driving these actuators at levels specified by the control apparatus 100 for controlling the pipe bender 10.

Figure 2:
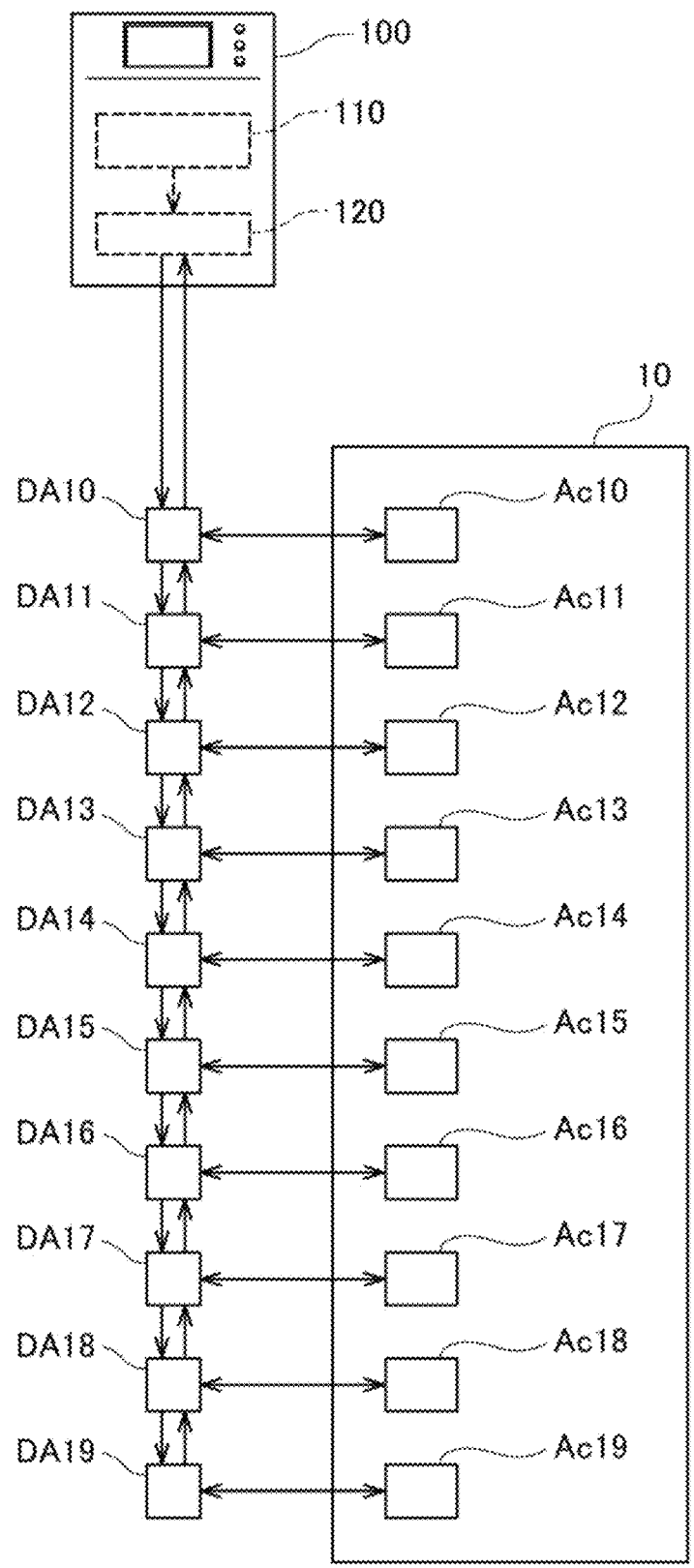
FIG. 2 is a conceptual block diagram of the control apparatus 100 for controlling the actions of actuators Ac10 to Ac19 included in the pipe bender 10.

FIG. 2 is a diagram showing the actuators Ac10 to Ac19 included in the pipe bender 10 connected to the control apparatus 100 with driver amplifiers DA10 to DA19. The actuator Ac10 is connected to and driven by the driver amplifier DA10. The actuator Ac11 is connected to and driven by the driver amplifier DA11. The actuators Ac12 to Ac19 are connected to and driven by the driver amplifiers DA12 to DA19. The driver amplifiers DA10 to DA19 are connected in series with one another. The driver amplifier at one end (the driver amplifier DA10 in the illustrated example) is connected to the control apparatus 100. However, any other connection structure may be used. For example, the driver amplifiers DA10 to DA19 may each be directly connected to the control apparatus 100.

To bend the pipe, the pipe bender 10 is to control the actuators Ac10 to Ac19 to act at appropriate timings and by appropriate displacements (such as movements or rotation angles). This involves a control program executable on the control apparatus 100 to specify appropriate timings and driving levels for the driver amplifiers DA10 to DA19. Creating the control program takes more effort than creating the hardware such as the pipe bender 10.

The inventors of the present application have developed a technique for automatically generating the control program, which has been patented. With the patented technique, a special action chart referred to as a "YOGO chart" is used to describe the operation of the automated manufacturing machine including multiple actuators. The action chart includes element actions of the multiple actuators (the actuators Ac10 to Ac19 in this example) included in the operation of the automated manufacturing machine (the pipe bender 10 in this example). This allows automatic generation of the control program from the YOGO chart. The principle of automatically generating the control program from the YOGO chart will be described.

B. Principle of Automatically Generating Control Program from YOGO Chart

Figure 3A:
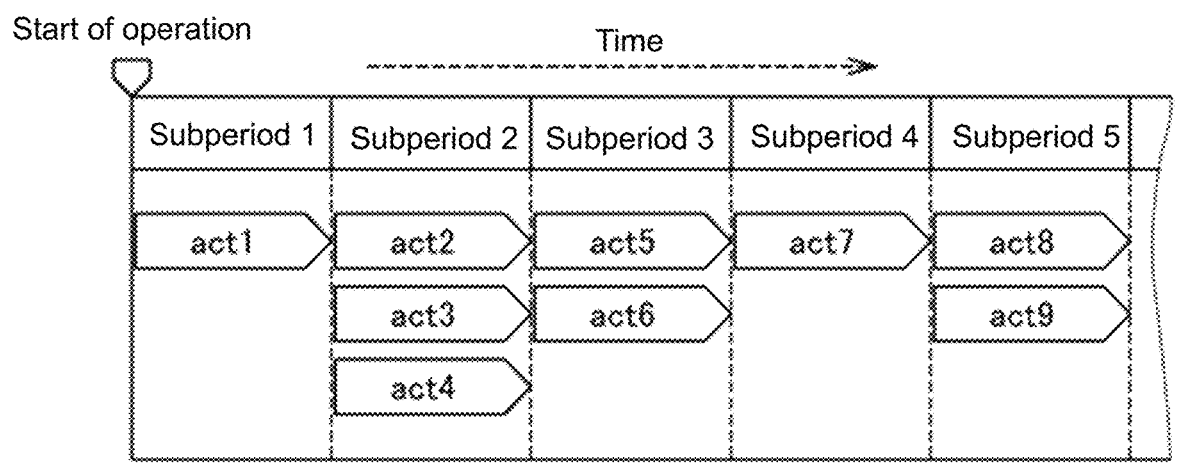
FIGS. 3A and 3B are diagrams showing the basic principle of automatically generating a control program from a YOGO chart.
Figure 3B:
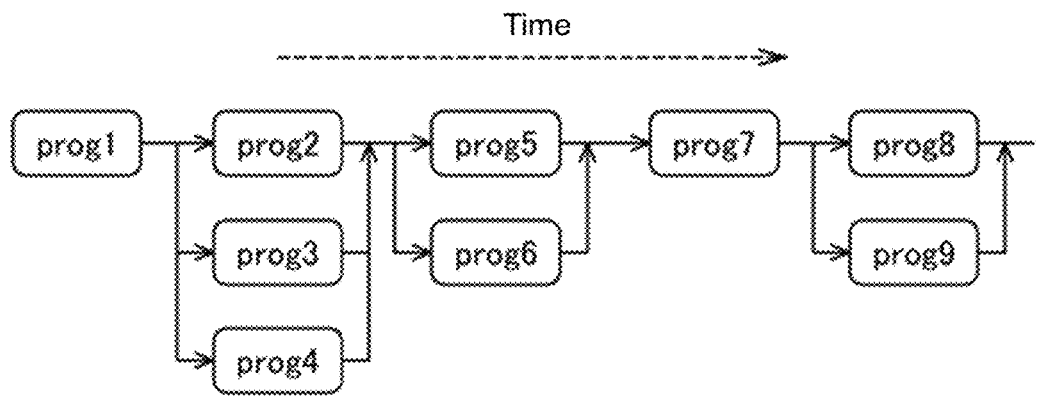

FIGS. 3A and 3B are diagrams showing the principle of automatically generating the control program for the automated manufacturing machine (the pipe bender 10 in this example) using the special action chart referred to as the YOGO chart. FIG. 3A is a primitive YOGO chart before undergoing various improvements. The YOGO chart in the present embodiment (described later) is an improvement on the primitive YOGO chart of FIG. 3A. However, the YOGO chart in the present embodiment uses the same principle as the primitive YOGO chart for automatically generating the control program. For easy understanding, the primitive YOGO chart of FIG. 3A is used to describe the principle of automatically generating the control program from the YOGO chart.

As described above, the YOGO chart describes the operation of the automated manufacturing machine by combining element actions of the multiple actuators included in the automated manufacturing machine. The element action of each actuator refers to a simple action of the actuator in the direction of the inherent degree of freedom by a specified displacement. For a rotary actuator such as a motor, for example, the element action is a rotation motion by a specified angle. For an actuator that moves forward or backward such as a cylinder, the element action is a forward or backward motion by a specified distance. For an actuator that rotates a ball screw with a motor to move a member engaged with the ball screw forward or backward, the element action is either a rotation motion of the motor by a specified angle or a motion of the member by a specified distance. Such a simple action of each actuator in the direction of the inherent degree of freedom by a specified displacement is referred to as an "element action".

The YOGO chart includes multiple subperiods into which the operation period from the start to the end of the operation of the automated manufacturing machine is divided. The element action of each actuator is assigned to a selected one of the subperiods. In the example of FIG. 3A, the first subperiod (subperiod 1) at the start of the operation of the automated manufacturing machine is assigned with an element action act1 of an actuator. The subsequent subperiod (subperiod 2) is assigned with an element action act2, an element action act3, and an element action act4 (of one or more actuators that are the same as or different from the actuator for the subperiod 1). The subsequent subperiod (subperiod 3) is assigned with an element action act5 and an element action act6. The subsequent subperiod (subperiod 4) is assigned with an element action act7. The subsequent subperiod (subperiod 5) is assigned with an element action act8 and an element action act9.

In this manner, a series of actions to be performed by the multiple actuators can be described. More specifically, the element action act1 of an actuator starts first. Upon completion of the element action act1, the element action act2, the element action act3, and the element action act4 of the corresponding actuators start. Upon completion of these element actions, the element action act5 and the element action act6 start. Upon completion of these element actions, the element action act7 starts. Upon completion of the element action act7, the element action act8 and the element action act9 start. Such a series of actions can be described. The YOGO chart thus describes the operation of the automated manufacturing machine by assigning the element actions of the multiple actuators included in the automated manufacturing machine to any of the subperiods.

As described above, each subperiod is the period for which the assigned actuator acts, rather than representing the length of the period. For example, the subperiod 1 has a length of time taken for the element action act1. The subperiod 2 has a length of time being the longest of the lengths of time taken for the element action act2, the element action act3, and the element action act4. The subperiods thus typically have different lengths of time.

As described above, the element actions of the actuators are simple actions, such as rotating a motor by a predetermined angle or moving a cylinder forward or backward by a predetermined distance. The element actions of the actuators can thus be performed with programs (program elements) that can be pre-created. For example, a program element prog1 can be pre-created to cause an actuator to perform the element action act1. Program elements prog2 to prog9 can also be pre-created to perform the respective element actions act2 to act9.

These program elements can be combined together as defined by the primitive YOGO chart of FIG. 3A to automatically generate the control program to cause the automated manufacturing machine to operate. More specifically, as shown in FIG. 3B, the program element prog1 is first activated. Upon completion of the program element prog1, the program elements prog2 to prog4 are activated. Upon completion of the program elements prog2 to prog4, the program elements prog5 and prog6 are activated. Upon completion of the program elements prog5 and prog6, the program element prog7 is activated. Upon completion of the program element prog7, the program elements prog8 and prog9 are activated. In this manner, the program elements are combined together to be activated sequentially in an order defined by the YOGO chart. This allows automatic generation of the control program to cause the automated manufacturing machine to operate from the YOGO chart.

The above process involves pre-creating all the program elements (the program elements prog1 to prog9 in this example) for performing the element actions. This is not difficult for the reasons below. FIG. 4 is a table including types of motions (such as a rotation motion and a forward or backward motion) and structures (schematic structures of actuators) for the element actions act1 to act9 shown in FIG. 3A. For example, the element action act1 is a rotation motion to be performed by an actuator that combines an AC servomotor and a reducer. More specifically, the AC servomotor rotates its shaft, and the reducer reduces the speed of rotation of the shaft. The element action act2 is a forward or backward motion to be performed by an actuator that combines an AC servomotor and a converter. More specifically, the AC servomotor rotates its shaft, and the converter converts the rotation of the shaft into a linear motion. The element action act3 is a forward or backward motion to be performed by an actuator including a linear servomotor.

Each of the element actions act 4, act 5, and act 8 is a rotation motion to be performed by an actuator that combines an AC servomotor and a reducer, similarly to the element action act1. Each of the element actions act 6 and act 7 is a forward or backward motion to be performed by an actuator that combines an AC servomotor and a converter, similarly to the element action act2. The element action act9 is a forward or backward motion to be performed by an actuator including a linear servomotor, similarly to the element action act3.

The structures for performing the element actions act 1, act 4, act 5, and act 8 all combine an AC servomotor and a reducer, and may differ simply in the output power or speed from the AC servomotor or the reduction ratio of the reducer. Thus, these element actions can be performed using a common program element. The structures for performing the element actions act 2, act 6, and act 7 all combine an AC servomotor and a converter. Thus, these element actions can be performed using a common program element. Similarly, the element actions act3 and act9 can be performed using a common program element. Thus, the element actions act1 to act9 can be performed simply by preparing the three program elements prog1 to prog3, selecting any of the program elements prog1 to prog3 appropriate for the element actions, and specifying appropriate displacements (such as rotation angles or movement distances). A common program element is usable for multiple element actions also in examples other than the example of FIGS. 3A and 3B.

FIG. 5 is a table including classified typical element actions usable for the YOGO chart. As shown in FIG. 5, the types of element actions can be classified into a forward or backward motion and a rotation motion, except for special motions. The structure for performing the forward or backward motion is basically any of the structure combining an AC servomotor and a converter, the structure including a linear servomotor, the structure including an air cylinder, or the structure including a hydraulic cylinder. Similarly, the structure for performing the rotation motion is basically either the structure combining an AC servomotor and a reducer or the structure combining a pulse motor and a reducer. All the element actions are thus classified into six types, including four forward or backward motions and two rotation motions. Element actions of the same type can be performed using the same program element. Thus, six program elements can cover substantially all the element actions.

The YOGO chart described below includes action identifiers for identifying the types of element actions. For example, an action identifier CNC-XA on the YOGO chart indicates a forward or backward motion to be performed by an actuator combining an AC servomotor and a converter. An action identifier CNC-XL indicates a forward or backward motion to be performed by an actuator including a linear servomotor. An action identifier AC indicates a forward or backward motion to be performed by an air cylinder. An action identifier OC indicates a forward or backward motion to be performed by a hydraulic cylinder. An action identifier CNC-θA indicates a rotation motion to be performed by an actuator combining an AC servomotor and a reducer. An action identifier OPN-OP indicates a rotation motion to be performed by an actuator combining a pulse motor and a reducer. The program element for performing the element action with each action identifier is assigned a specific program element number. The program element number is used to identify the program element.

C. Describing YOGO Chart

Figure 6:
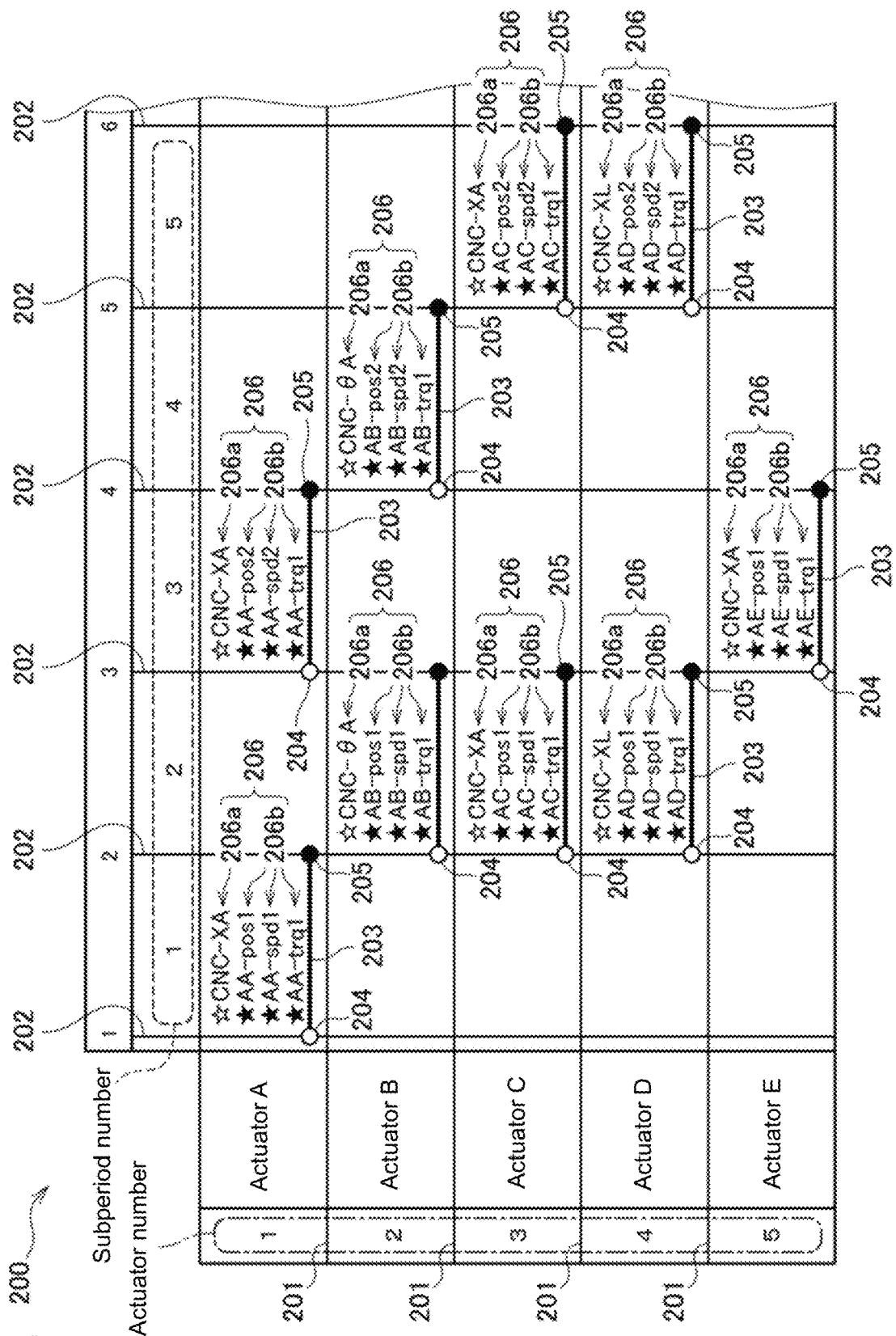
FIG. 6 is an example YOGO chart 200 shown partially.

FIG. 6 is the YOGO chart 200 showing description of the operation of the automated manufacturing machine. In the illustrated example, the automated manufacturing machine includes five actuators A to E. As shown in FIG. 6, the YOGO chart 200 is a large table with multiple horizontal lines and multiple vertical lines intersecting with each other. The horizontal lines of the multiple intersecting lines are referred to as "separation lines" 201, and the vertical lines are referred to as "trigger lines" 202.

The trigger lines 202 are given serial numbers starting with number 1. In the example of FIG. 6, the trigger lines 202 have their serial numbers written in the top field of the YOGO chart 200. Each area between adjacent trigger lines 202 corresponds to the subperiod described above with reference to FIGS. 3A and 3B. The subperiods are also given serial numbers (hereafter, subperiod numbers) starting with 1. For the example YOGO chart 200 of FIG. 6, the trigger lines 202 are drawn in the vertical direction, and thus the subperiods between the trigger lines 202 are arranged in the horizontal direction. However, the trigger lines 202 may be drawn in the horizontal direction. In this case, the subperiods are arranged in the vertical direction.

The YOGO chart 200 in the present embodiment is divided into multiple horizontal areas (hereafter, rows) by the multiple separation lines 201. The horizontal rows are given serial numbers (hereafter, actuator numbers) starting with number 1. Each actuator included in the automated manufacturing machine is assigned to any one of the multiple horizontal rows. For example, the automated manufacturing machine may include five actuators A to E. In this case, as shown in FIG. 6, the actuator A is assigned to the row with the actuator number 1. The actuator B is assigned to the row with the actuator number 2. The actuator C is assigned to the row with the actuator number 3. The actuator D is assigned to the row with the actuator number 4. The actuator E is assigned to the row with the actuator number 5.

The element action of each of the actuators A to E is written at an appropriate position in the horizontal row assigned with the actuator. For example, an element action to be performed by the actuator A in the subperiod 1 is written at the coordinate position of the cell at the intersection of the horizontal row with the actuator number 1 and a vertical area (hereafter, a column) with the subperiod number 1. To write the element action, an action line 203 is drawn at the coordinate position of the cell for the element action on the YOGO chart 200, and an action identifier 206a and parameter identifiers 206b are written above the action line 203.

In the example of FIG. 6, the YOGO chart 200 includes the action line 203 in the cell at the coordinate position with the actuator number 1 and the subperiod number 1 (hereafter, the chart coordinates (1, 1)). The action line 203 has a start point 204 indicated by a white circle and an end point 205 indicated by a black circle. Above the action line 203, the element action 206 is written using the action identifier 206a (CNC-XA) following a white star and using three parameter identifiers 206b each following a black star. The element action 206 with the start point 204 on the number-1 trigger line 202 and with the end point 205 on the number-2 trigger line 202 indicates that the element action 206 starts at the time indicated by the number-1 trigger line 202 and ends at the time indicated by the number-2 trigger line 202. As described above with reference to FIG. 5, the action identifier 206a (CNC-XA) above the action line 203 indicates a forward or backward motion to be performed by an actuator combining an AC servomotor and a converter. In other words, the action identifier 206a (CNC-XA) written at the coordinate position with the actuator number 1 indicates that the actuator A corresponding to the actuator number 1 combines the AC servomotor and the converter to perform the forward or backward motion. The parameter identifiers 206b written below the action identifier 206a indicate the details of the forward or backward motion (specifically, the movement distance, the movement speed, and the movement torque for the forward or backward motion). The parameter identifiers 206b will be described in detail later.

The cell at the coordinate position with the actuator number 2 and the subperiod number 2 (the chart coordinates (2, 2)) includes the element action 206 having the action identifier 206a (CNC-θA) and three parameter identifiers 206b above the action line 203. The action identifier 206a (CNC-θA) indicates a rotation motion to be performed by an actuator combining an AC servomotor and a reducer. Thus, the actuator B corresponding to the actuator number 2 combines the AC servomotor and the reducer to perform the rotation motion. The three parameter identifiers 206b written below the action identifier 206a indicate the rotation angle, the rotation speed, and the rotation torque. The parameter identifiers 206b have specific numerical values (parameter values) that are predefined for each actuator.

FIGS. 7A to 7E are tables, referred to as "tables B", each including parameter values predefined for the parameter identifiers 206b for the corresponding actuator. For example, the table B of FIG. 7A includes five parameter identifiers 206b for the actuator A. As described above, the actuator A combines the AC servomotor and the converter to perform the forward or backward motion. The actuator A thus has the parameter values of the movement distance, the movement speed, and the movement torque specified by the parameter identifiers 206b. More specifically, the two parameter identifiers 206b (AA-pos1 and AA-pos2) specify the movement distance and have the respective parameter values of 50 and 150 mm. The two parameter identifiers 206b (AA-spd1 and AA-spd2) specify the movement speed and have the respective parameter values of 10 and 15 mm/s. The parameter identifier 206b (AA-trq1) specifies the allowable movement torque for the forward or backward motion using a percentage to the standard torque of the AC servomotor. More specifically, the parameter identifier 206b (AA-trq1) has a parameter value of 100%, indicating that the maximum allowable torque is the standard torque.

The table B of FIG. 7B includes five parameter identifiers 206b for the actuator B. As described above, the actuator B combines the AC servomotor and the reducer to perform the rotation motion. The actuator B thus has the parameter values of the rotation angle, the rotation speed, and the rotation torque specified by the parameter identifiers 206*b*. More specifically, the two parameter identifiers 206*b* (AB-pos1 and AB-pos2) specify the rotation angle and have the respective parameter values of 90 and 30°. The two parameter identifiers 206*b* (AB-spd1 and AB-spd2) specify the rotation speed and have the respective parameter values of 15 and 10°/s. The parameter identifier 206*b* (AB-trq1) specifies an allowable rotation torque for the forward or backward motion using a percentage to the standard torque of the AC servomotor. More specifically, the parameter identifier 206*b* (AB-trq1) has a parameter value of 100%, indicating that the maximum allowable torque is the standard torque.

Similarly, the table B of FIG. 7C includes five parameter identifiers 206*b* for the actuator C. The table B of FIG. 7D includes five parameter identifiers 206*b* for the actuator D. The table B of FIG. 7E includes three parameter identifiers 206*b* for the actuator E. As described above, the parameter identifiers 206*b* defined for each actuator are specific to the actuator. For example, the parameter identifier 206*b* (AB-spd1) specifies the rotation speed of the actuator B and is unusable for specifying other items of information.

The YOGO chart 200 includes the element actions 206 with the action identifiers 206*a* and the parameter identifiers 206*b* described above. For example, the YOGO chart 200 of FIG. 6 includes the element action 206 at the chart coordinates (1, 1) (specifically, at the coordinate position with the actuator number 1 and the subperiod number 1). The element action 206 has the action identifier 206*a* (CNC-XA) and the parameter identifiers 206*b* (AA-pos1, AA-spd1, and AA-trq1). This indicates that the element action 206 is a forward or backward motion of an actuator with a movement distance of 50 mm, a movement speed of 10 mm/s, and the maximum allowable torque being the standard torque of the AC servomotor.

As described above, the YOGO chart 200 includes the action identifiers 206*a* and the parameter identifiers 206*b* of the element actions 206 written in the cells at the coordinate positions determined by the actuator numbers and the subperiod numbers. The coordinate position at which each element action 206 is written has the actuator number that indicates the actuator to perform the element action 206, and has the subperiod number that indicates the time to perform the element action 206. Each element action 206 has the action identifier 206*a* and the parameter identifiers 206*b* that indicate the details of the element action 206. The YOGO chart 200 thus describes the operation of the automated manufacturing machine with the element actions 206 written at the coordinate positions. For the YOGO chart 200 of FIG. 6, for example, the actuator A acts first as specified by its element action 206. Upon completion of the action of the actuator A, the actuators B to D act as specified by their element actions 206. Upon completion of the actions of the actuators B to D, the actuators A and E act as specified by their element actions 206. Upon completion of the actions of the actuators A and E, the actuators C and D act as specified by their element actions 206. The chart can describe such a series of actions.

In the present embodiment, each element action 206 is written on the YOGO chart 200 using the action identifier 206*a* and the multiple parameter identifiers 206*b*. However, each element action 206 may be written on the YOGO chart 200 in another manner. For example, the example of FIG. 6 may be modified to use tables each including the multiple parameter identifiers 206*b* written below the corresponding action identifier 206*a* associated with their parameter values.

Each table may have a specific table identifier. The YOGO chart 200 may include, instead of the multiple parameter identifiers 206*b* written below each action identifier 206*a*, the table identifier of the table including parameter values for the parameter identifiers 206*b*.

Figure 8A:
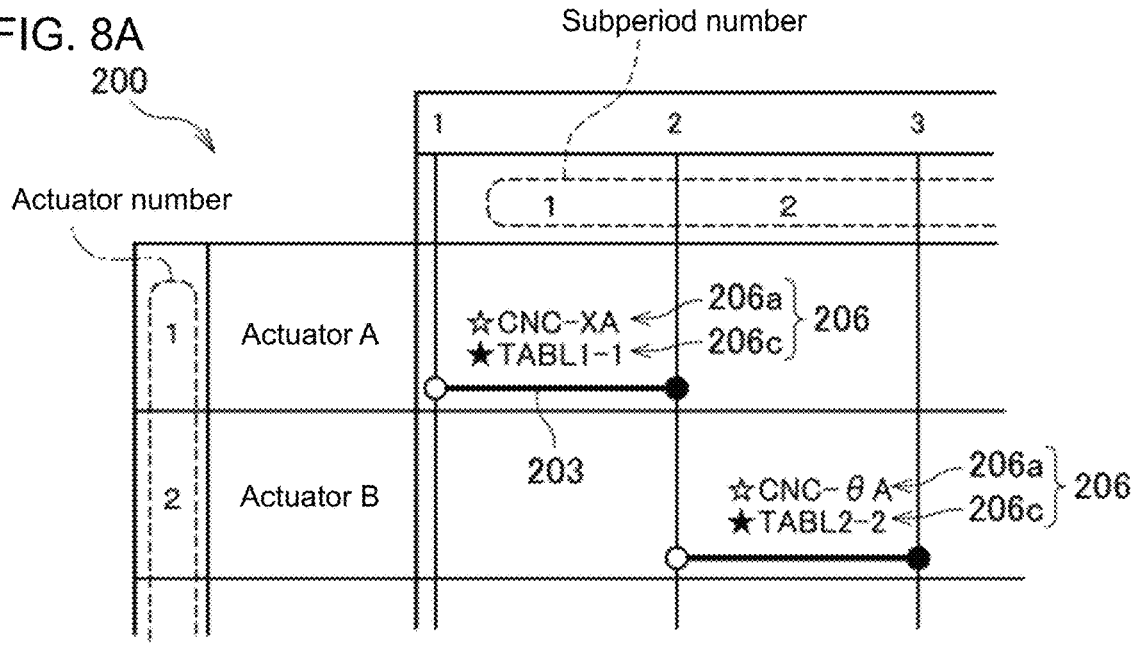

FIGS. 8A to 8C are a chart and tables showing the manner of writing the element actions 206 on the YOGO chart 200 using the table identifiers 206*c*. To write the element actions 206 using the table identifiers 206*c* as shown in FIG. 8A, the action identifiers 206*a* are written above the action lines 203, and the table identifiers 206*c* are written between the action identifiers 206*a* and the action lines 203. In the example of FIG. 8A, the action identifier 206*a* (CNC-XA) and the table identifier 206*c* (TABL1-1) are written at the chart coordinates (1, 1) (specifically, at the coordinate position with the actuator number 1 and the subperiod number 1). The action identifier 206*a* (CNC-θA) and the table identifier 206*c* (TABL2-2) are written at the chart coordinates (2, 2). Each table identifier 206*c* includes the representation of its coordinate position on the YOGO chart 200, such as TABL1-1 being the table identifier 206*c* at the chart coordinates (1, 1), and TABL2-2 being the table identifier 206*c* at the chart coordinates (2, 2). The table identifiers 206*c* with such representations have the effects below.

As described above, a single coordinate position on the YOGO chart 200 has a single element action 206. The single element action 206 has a single table identifier 206*c*. Thus, the single coordinate position has the single table identifier 206*c*. Viewing the table identifier 206*c* including the representation of its coordinate position, the engineer can learn the coordinate position for the table identifier 206*c*.

FIG. 8B is an example table including information for the table identifier 206*c* (TABL1-1). This table, corresponding to the chart coordinates (1, 1), includes the details of the element action to be performed by the actuator with the actuator number 1 (the actuator A in this example) at the time with the subperiod number 1. As shown in FIG. 8B, the table includes parameter names, information corresponding to the parameter names, and parameter values. The parameter names are equivalent to the parameter identifiers 206*b* described above with reference to FIGS. 6 and 7A to 7E. For the parameter identifiers 206*b* being written on the YOGO chart 200 as described above with reference to FIGS. 6 and 7A to 7E, the term "identifiers" are used. For the table identifiers 206*c* being written on the YOGO chart 200 instead of the parameter identifiers 206*b*, the term "parameter names" are used.

Similarly, FIG. 8C is an example table for the table identifier 206*c* (TABL2-2). This table, corresponding to the chart coordinates (2, 2), includes the details of the element action to be performed by the actuator with the actuator number 2 (the actuator B in this example) at the time with the subperiod number 2.

As compared with the table B of FIG. 7A, FIG. 8B includes information being a part of the information in FIG. 7A. As compared with the table B of FIG. 7B, FIG. 8C includes information being a part of the information in FIG. 7B. Unlike the above YOGO chart 200 of FIG. 6 including the parameter identifiers 206*b*, the YOGO chart 200 of FIG. 8A includes the table identifiers 206*c* of the tables that include information equivalent to the parameter identifiers 206*b*. So, the YOGO chart 200 of FIG. 8A as well can define the parameter values of the element actions 206.

D. Operation for Bending Pipe Performed by Pipe Bender 10

As described above, the YOGO chart 200 can describe any of various operations of automated manufacturing machines. The YOGO chart 200 can describe the operation for bending the pipe to be performed by the pipe bender 10 shown in FIG. 1. An overview of the operation for bending the pipe performed by the pipe bender 10 will now be described, before the YOGO chart 200 for the operation is described.

D-1. Overview of Operation for Bending Pipe

Figure 9A:
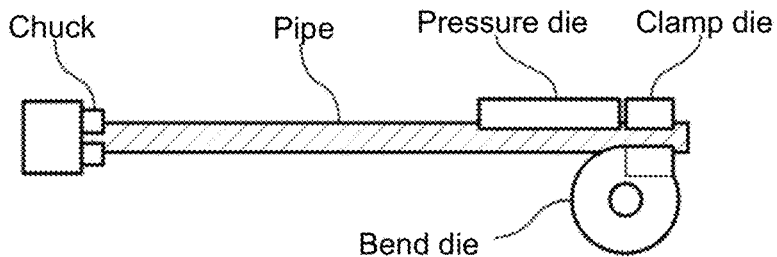
FIGS. 9A, 9B, 9C, and 9D are diagrams showing an overview of an operation for bending a pipe performed by the pipe bender 10.

FIGS. 9A to 9D are diagrams showing an overview of the operation for bending the pipe performed by the pipe bender 10. To bend the pipe, as shown in FIG. 9A, the pipe is held by a chuck at the rear end and is held by two metal fixtures (bend die and a clamp die) at the position on the pipe to be bent. The clamp die has a shallow U-shaped recess to receive the pipe. The bend die is roughly a thick circular plate with its peripheral surface having a shallow U-shaped recess to receive the pipe. The pipe is received in the recess on the clamp die and the U-shaped recess on the peripheral surface of the bend die, thus being held firmly. A pressure die, which is a metal fixture, is placed in contact with the pipe in the same direction as the clamp die downstream (nearer the chuck) from the portion on the pipe held by the clamp die and the bend die. The pressure die also has a shallow U-shaped recess to receive the pipe.

Figure 9B:
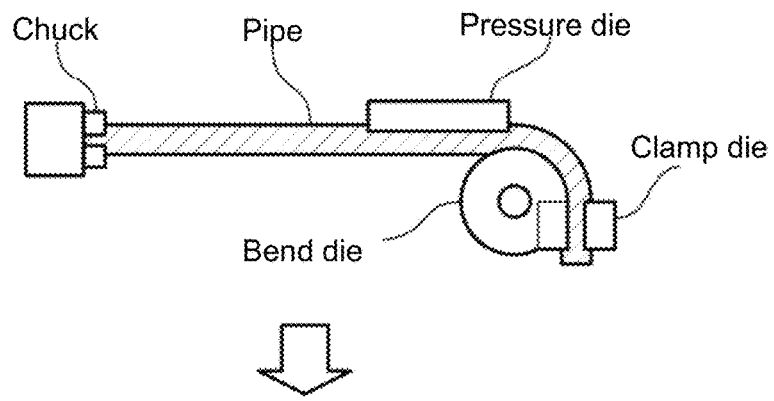
Figure 9C:
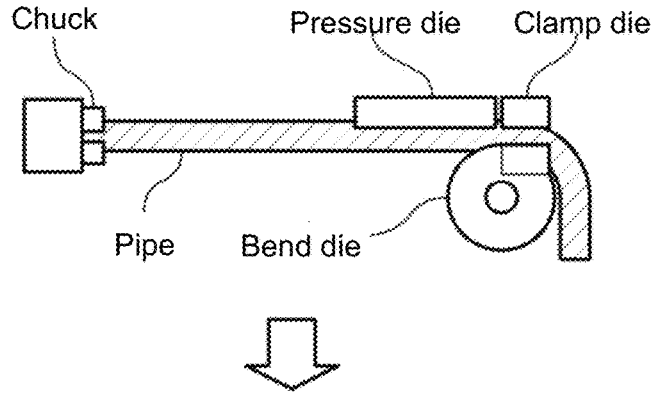

As shown in FIG. 9B, the clamp die and the bend die are turned about the rotation axis of the bend die while holding the pipe together to bend the pipe. As the clamp die and the bend die are turned, the chuck is moved forward to bend the pipe around the peripheral surface of the bend die. Being held by the chuck alone at the rear end, the pipe may deform between the bend die and the chuck and may fail to be bent around the bend die at an accurate angle. However, the pressure die is placed in contact with the pipe in the same direction as the clamp die as described above, and thus allows the pipe to bend at an accurate angle without deforming.

Figure 9D:
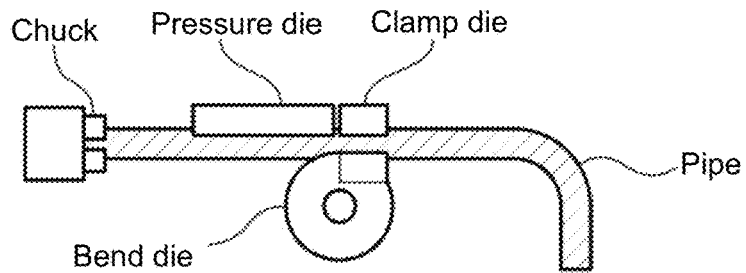

After the pipe is bent in the above manner, the clamp die and the bend die together holding the pipe are loosened and turned in the opposite direction to return to their initial positions. As shown in FIG. 9D, the pipe is moved forward by moving the chuck forward, and is then held by the clamp die and the bend die again. Before the pipe is held, the chuck may be turned to twist the pipe to change the bending direction of the pipe. The clamp die and the bend die may then be turned about the rotation axis of the bend die while holding the pipe together in the manner described above. This allows the pipe to be bent at a different position. Repeating these processes can bend the pipe in different directions at different positions. Based on the processes described above, the YOGO chart 200 describing the operation for bending the pipe to be performed by the pipe bender 10 in FIG. 1 will now be described.

D-2. YOGO Chart 200 Describing Operation for Bending Pipe

Figure 10:
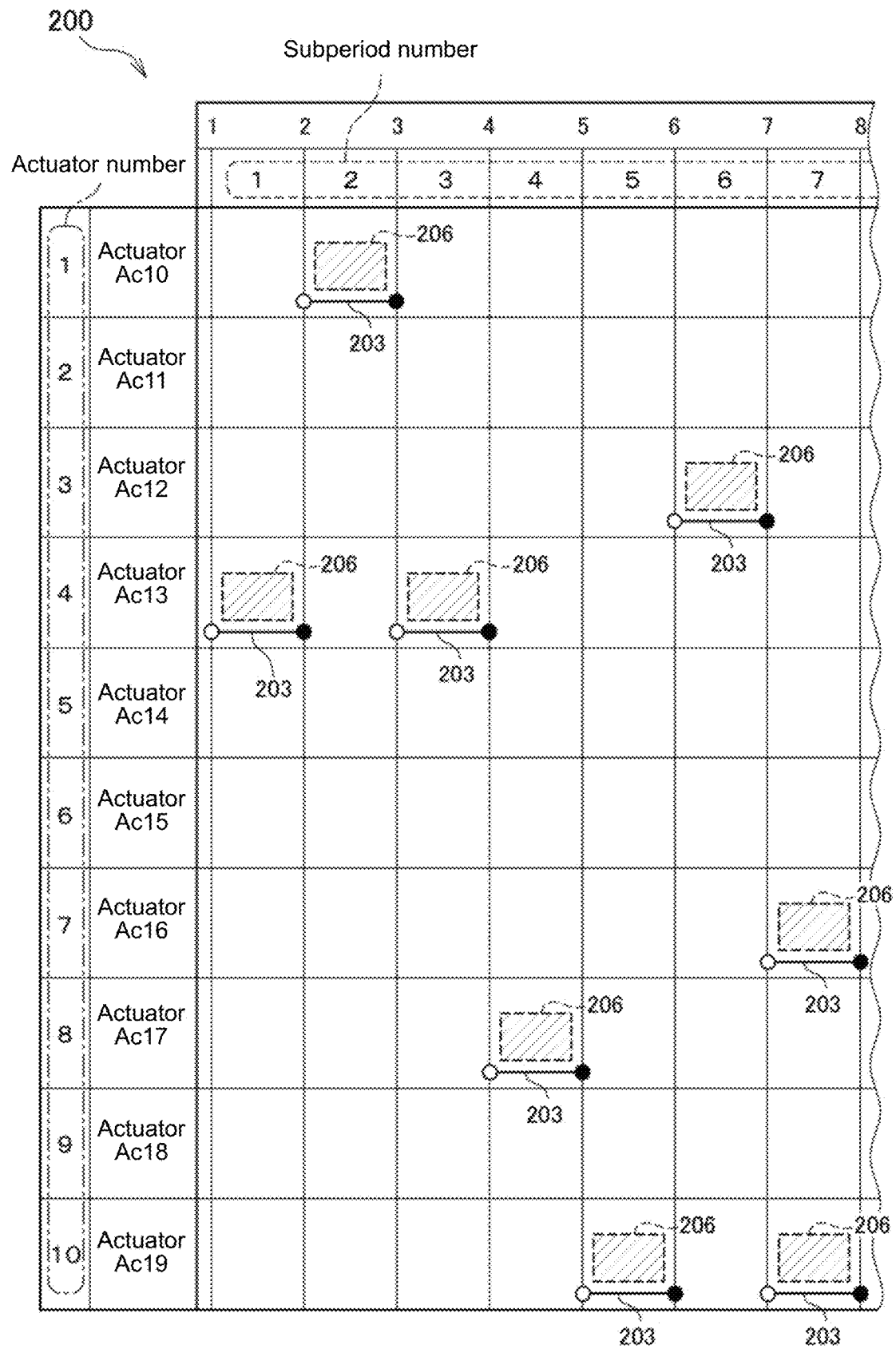
FIG. 10 is the YOGO chart 200 describing the operation for bending the pipe to be performed by the pipe bender 10, showing the first half.
Figure 11:
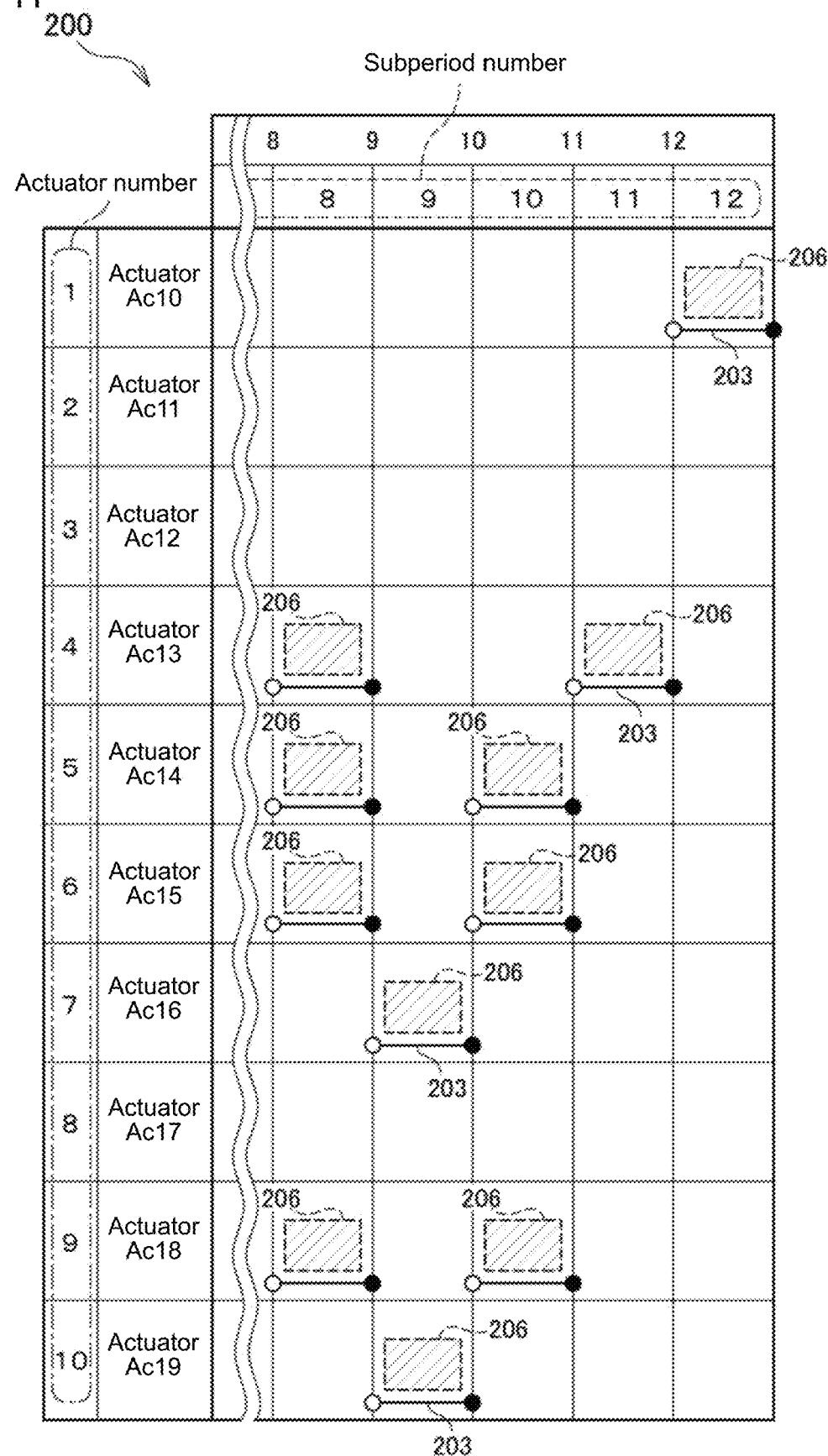
FIG. 11 is the YOGO chart 200 describing the operation for bending the pipe to be performed by the pipe bender 10, showing the second half.

FIG. 10 is the YOGO chart 200 describing the operation for bending the pipe to be performed by the pipe bender 10, showing the first half. FIG. 11 is the YOGO chart 200 showing the second half. As described above with reference to FIG. 1, the pipe bender 10 includes the ten actuators Ac10 to Ac19. The YOGO chart 200 thus includes ten rows (horizontal fields). The rows have the actuator numbers 1 to 10 that are respectively assigned with the ten actuators Ac10 to Ac19.

To bend the pipe, the chuck 12*b* is to hold the pipe first. To achieve this, the conveyor unit 12 is moved forward to move the chuck 12*b* to the position for receiving the pipe. Thus, as shown in FIG. 10, the YOGO chart 200 includes the action line 203 at the coordinate position with the actuator number 4 and the subperiod number 1 (hereafter, the chart coordinates (4, 1)). The actuator number 4 corresponds to the actuator Ac13 for moving the conveyor unit 12. Above the action line 203, the element action 206 is written. The element action 206 written at the chart coordinates (4, 1) is shown in FIG. 12A. More specifically, the actuator Ac13 combines an AC servomotor and a converter to perform a forward or backward motion. The actuator Ac13 thus has the element action 206 with the action identifier 206*a* (CNC-XA) and the parameter identifiers 206*b* (BO-CA03, BO-CA04, and BO-CA05) respectively indicating the movement distance, the movement speed, and the movement torque. These parameter identifiers 206*b* have parameter values that are predefined in the table B for the actuator Ac13.

Upon moving to the position for receiving the pipe, the chuck 12*b* is to hold the pipe. Thus, the YOGO chart 200 includes the action line 203 at the coordinate position with the actuator number 1 and the subperiod number 2 (hereafter, the chart coordinates (1, 2)). The actuator number 1 corresponds to the actuator Ac10 for opening or closing the chuck 12*b*. Above the action line 203, the element action 206 is written. The element action 206 written at the chart coordinates (1, 2) is shown in FIG. 12B.

With the chuck 12*b* holding the pipe, the conveyor unit 12 is then moved backward to move the pipe to the home position. Thus, the YOGO chart 200 includes the action line 203 at the coordinate position corresponding to the actuator Ac13 and the subperiod number 3 (hereafter, the chart coordinates (4, 3)). The actuator Ac13 is for moving the pipe. Above the action line 203, the element action 206 for moving the pipe is written. The element action 206 written at the chart coordinates (4, 3) is shown in FIG. 12C.

The bend die is then selected in accordance with an intended radius (bend radius) of the pipe. As described above with reference to FIGS. 9A to 9D, the pipe is bent around the bend die and has the bend radius that depends on the radius of the bend die. The pipe bender 10 in FIG. 1 includes three bend dies with different radii and can use a selected one of the bend dies. The process for selecting the bend die is hereafter referred to as "bend die selection". As described above, the bend die is a circular plate. The machining unit 13 includes the three bend dies vertically stacked on one another. To select a bend die to be used, the machining unit 13 is raised or lowered to move the bend die to the position of the pipe. The machining unit 13 is raised or lowered by the actuator Ac17 that combines an AC servomotor and a converter to perform a forward or backward motion. Thus, the YOGO chart 200 includes the action line 203 at the coordinate position with the actuator number 8 and the subperiod number 4 (hereafter, the chart coordinates (8, 4)). The actuator number 8 corresponds to the actuator Ac17. Above the action line 203, the element action 206 for the bend die selection is written. The element action 206 written at the chart coordinates (8, 4) is shown in FIG. 12D. The element action 206 shown in FIG. 12D has the action identifier 206*a* (CNC-XL) indicating that the actuator Ac17 has the structure combining the AC servomotor and the converter.

After the bend die is selected, the clamp die is moved toward the selected bend die to hold the pipe loosely with these dies. The process for moving the clamp die toward the bend die to hold the pipe loosely is hereafter referred to as "preclamping". The clamp die is moved by the actuator Ac19 performing a forward or backward motion. Thus, the YOGO chart 200 includes the action line 203 at the coordinate position with the actuator number 10 and the subperiod number 5 (hereafter, the chart coordinates (10, 5)). The actuator number 10 corresponds to the actuator Ac19. Above the action line 203, the element action 206 for the preclamping is written. The element action 206 written at the chart coordinates (10, 5) is shown in FIG. 12E.

The chuck 12b is then moved horizontally to place the pipe in close contact with the bend die. The pipe is to be placed in close contact with the bend die for bending the pipe. However, the pipe is to avoid scratches on its surface that may be produced during axial movement for changing the bending position while being in close contact with the bend die. Thus, the pipe is placed in slight contact with the bend die first, and is then placed in close contact with the bend die immediately before being bent. The process for moving the chuck 12b horizontally to place the pipe in close contact with the bend die is hereafter referred to as "close-contact placement". The chuck 12b is moved horizontally by the actuator Ac12. Thus, the YOGO chart 200 includes the action line 203 at the coordinate position with the actuator number 3 and the subperiod number 6 (hereafter, the chart coordinates (3, 6)). The actuator number 3 corresponds to the actuator Ac12. Above the action line 203, the element action 206 for the close-contact placement is written. The element action 206 written at the chart coordinates (3, 6) is shown in FIG. 12F.

With the pipe placed in close contact with the bend die, the clamp die preclamping the pipe is moved toward the bend die to hold the pipe firmly with these dies. The pressure die is also moved to be flush with the clamp die, or specifically, to have a surface at the same level as the surface of the clamp die. For the clamp die holding the pipe firmly, the pressure die is also placed in close contact with the pipe. The process for moving the clamp die toward the bend die to hold the pipe firmly and placing the pressure die in close contact with the pipe is hereafter referred to as "main clamping". In the main clamping, the clamp die is moved by the actuator Ac19, and the pressure die is moved by the actuator Ac16. Thus, the YOGO chart 200 includes the action line 203 at the coordinate position with the actuator number 7 and the subperiod number 7 (hereafter, the chart coordinates (7, 7)), and the action line 203 at the coordinate position with the actuator number 10 and the subperiod number 7 (hereafter, the chart coordinates (10, 7)). The actuator number 7 corresponds to the actuator Ac16, and the actuator number 10 corresponds to the actuator Ac19. Above each action line 203, the element action 206 of the corresponding actuator Ac16 or Ac19 is written. The element action 206 written at the chart coordinates (7, 7) is shown in FIG. 12G. The element action 206 written at the chart coordinates (10, 7) is shown in FIG. 12H.

After the above main clamping is complete, the process for bending the pipe (hereafter, bending) starts. As shown in FIG. 11, the bending uses the four actuators Ac13, Ac14, Ac15, and Ac18 acting at the same time. More specifically, the actuator Ac18 acts first to turn the bend die and the clamp die about the rotation axis of the bend die (refer to FIG. 9B). In accordance with this action, the actuator Ac13 acts to move the chuck 12b forward (refer to FIG. 9B). In accordance with these actions, the actuators Ac14 and Ac15 also act.

The actuators Ac14 and Ac15 perform the functions described below. As described above, the clamp die is moved toward the bend die to hold the pipe and is also moved about the rotation axis of the bend die. The actuator Ac19, which is used to move the clamp die to hold the pipe, also moves about the rotation axis of the bend die together with the clamp die. This may cause tension of various electrical cables connected to the actuator Ac19. The electrical cables may be sufficiently long to avoid being tensioned. However, the long electrical cables may be entangled in other actuators while being moved. To avoid this, the electrical cables may be loosened or tightened in accordance with movement of the clamp die. Thus, the pipe bender 10 shown in FIG. 1 includes the actuators Ac14 and Ac15 to loosen or tighten the electrical cables connected to the actuator Ac19. As the clamp die is moved about the rotation axis of the bend die and the pressure die is moved forward, the actuators Ac14 and Ac15 move forward to loosen the electrical cables connected to the actuator Ac19.

The actuator Ac18 for moving the clamp die about the rotation axis of the bend die has the actuator number 9. The actuator Ac13 for moving the chuck 12b forward has the actuator number 4. The actuators Ac14 and Ac15 for loosening the electrical cables have the actuator numbers 5 and 6. These actuators Ac13, Ac14, Ac15, and Ac18 act in the subperiod with the subperiod number 8. Thus, the YOGO chart 200 includes the action lines 203 at the positions of the chart coordinates (4, 8), (5, 8), (6, 8), and (9, 8). Above each action line 203, the element action 206 of the corresponding actuator Ac13, Ac14, Ac15, or Ac18 is written. The element actions 206 written at these chart coordinates are shown in FIGS. 12I, 12J, 12K, and 12L. The element actions 206 shown in FIGS. 12J and 12K each have the action identifier 206a (CNC-XL) indicating that the actuators Ac14 and Ac15 each have the structure combining the AC servomotor and the converter.

After the above bending is complete, the clamp die and the pressure die in close contact with the pipe in the main clamping are released from the pipe and returned to the original positions. This process is hereafter referred to as "die release". The die release uses the actuators Ac16 and Ac19. The actuator Ac16 has the actuator number 7, and the actuator Ac19 has the actuator number 10. The YOGO chart 200 thus includes the action lines 203 at the positions of the chart coordinates (7, 9) and (10, 9). Above each action line 203, the element action 206 of the corresponding actuator Ac16 or Ac19 is written. The element actions 206 written at these chart coordinates are shown in FIGS. 12M and 12N.

After the die release is complete, the clamp die moved about the rotation axis of the bend die in the pipe bending is returned to the original position. This process is hereafter referred to as "die return". As described above, in the bending, the clamp die is moved by the actuator Ac19 about the rotation axis of the bend die to hold the pipe, and the actuator Ac19 also moves about the rotation axis of the bend die. In this process, the actuator Ac19 has the electrical cables loosened by the actuators Ac14 and Ac15 moving forward. In the die return, in contrast, the clamp die is moved in the opposite direction about the rotation axis of the bend die. This may cause the loosened electrical cables to be entangled in other actuators. Thus, in the die return, the actuator Ac19 has the electrical cables tightened by the actuators Ac14 and Ac15 moving backward as the clamp die is returned to the original position. Thus, the YOGO chart 200 includes the action lines 203 at the positions of the chart coordinates (5, 10), (6, 10), and (10, 10). Above each action line 203, the element action 206 of the corresponding actuator Ac14, Ac15, or Ac19 is written. The element action 206 written at the chart coordinates (5, 10) is shown in FIG. 12O. The element actions 206 written at the chart coordinates (6, 10) and (10, 10) are not shown.

After the above die return is complete, the actuator Ac13 moves forward to move the conveyor unit 12 to the position for removing the pipe. The chuck 12b holding the pipe is then opened to remove the pipe. Thus, the YOGO chart 200 includes the element action 206 of the actuator Ac13 written at the chart coordinates (4, 11) and the element action 206 of the actuator Ac10 written at the chart coordinates (1, 12). The element actions 206 written at the chart coordinates (4, 11) and (1, 12) are not shown.

To bend the pipe at another position, the pipe is conveyed by the conveyor unit 12 to the subsequent position for pipe bending (bending position), instead of the position for removing the pipe. The chuck 12*b* is then turned in accordance with the subsequent pipe bending direction. The element action 206 written at the chart coordinates (4, 11) has the parameter identifiers 206*b* for conveying the pipe to the bending position. The chart includes the element action 206 for turning the chuck 12*b* written at the chart coordinates (2, 12), instead of the element action 206 for opening the chuck written at the chart coordinates (1, 12). The element action 206 written at the chart coordinates (2, 12) is not shown.

After conveying the pipe to the subsequent bending position and turning the chuck 12*b* in accordance with the bending direction, the machine performs actions similar to those for the subperiods with the subperiod numbers 4 to 10. More specifically, the machine performs, in sequence, the above seven processes including "bend die selection", "preclamping", "close-contact placement", "main clamping", "bending", "die release", and "die return". This completes the pipe bending operation at the new position. The "pipe bending operation" hereafter refers to a series of actions corresponding to the above seven processes. To bend the pipe at still another position, the pipe is conveyed to the subsequent bending position, the chuck 12*b* is turned in accordance with the bending direction, and then the pipe bending operation is performed again.

The above processes are repeated until all the bending operations are complete. The pipe is then conveyed to the position for being removed, and the chuck 12*b* is opened (in other words, the YOGO chart 200 includes information similar to the information for the subperiods with numbers 11 and 12 in FIG. 11). The YOGO chart 200 described above is created and read by a computer to generate the control program for the pipe bender 10 automatically with the above mechanism.

Figure 13:
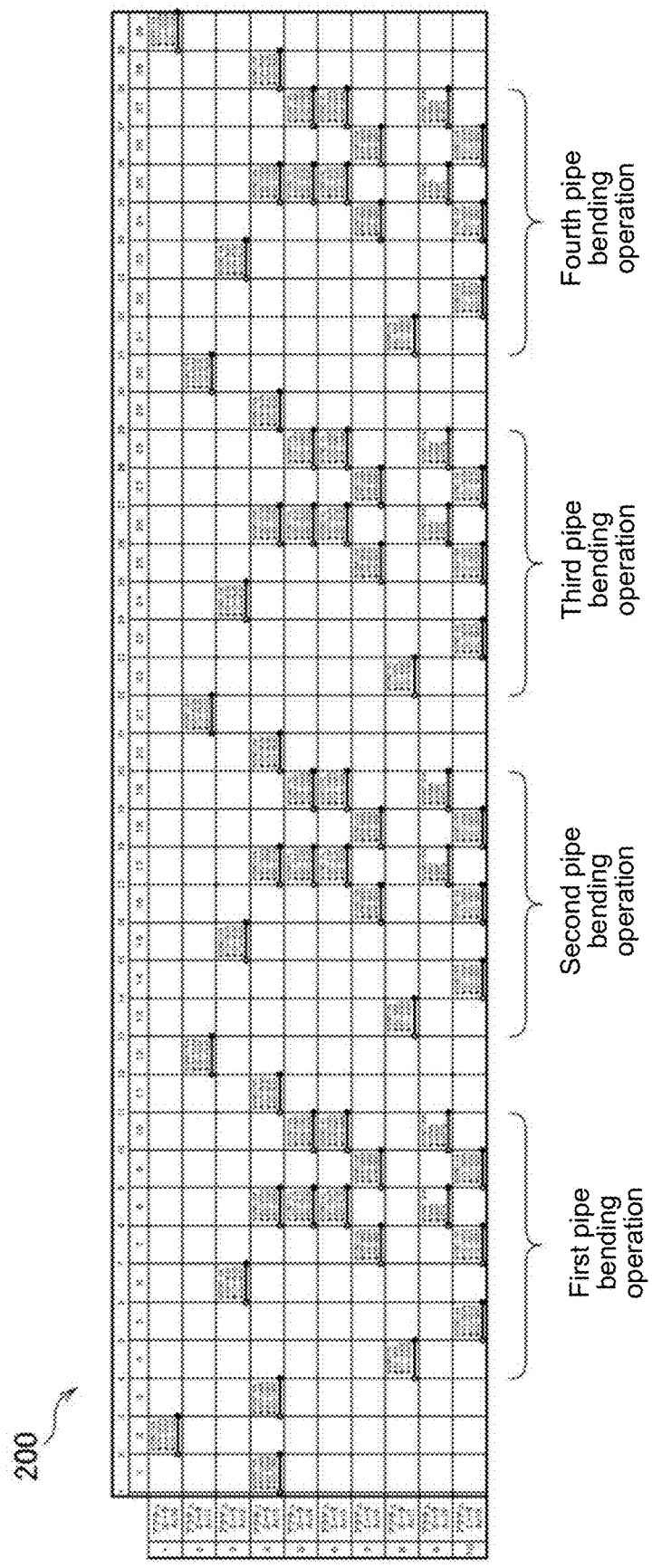
FIG. 13 is the entire YOGO chart 200 describing an operation of bending the pipe at four positions on the pipe to be performed by the pipe bender 10.

FIG. 13 is the entire YOGO chart 200 for bending the pipe at four positions on the pipe. The YOGO chart 200 of FIG. 13 is scaled down to be shown entirely. The YOGO chart 200 of FIG. 13 describes bending the pipe at four positions and is lengthy. The YOGO chart 200 includes plenty of subperiods assigned with the element actions 206 of actuators. To describe bending the pipe at more positions, the YOGO chart 200 may include more subperiods. The YOGO chart 200 of FIG. 13 includes 39 subperiods.

To create the YOGO chart 200, the element actions 206 are written one by one in subperiods. Each individual element action 206 is a simple action included in the entire operation. To write correct element actions 206, the engineer refers to the information written in the preceding subperiods. For a lengthy YOGO chart 200, however, the engineer may have difficulty in referring to the information in the preceding subperiods. For example, to write the element actions 206 in subperiods on the second half of the YOGO chart 200 of FIG. 13, the engineer refers to the information in all the preceding subperiods to identify the number of times the pipe bending operation is repeated before the subperiods. For a lengthy YOGO chart 200, however, the engineer may have difficulty in referring to all the written subperiods. Further, the element action 206 written in each individual subperiod is simple and may lack information enough for the engineer to identify the task to be achieved by the element action 206. In other words, the engineer can identify the task of each element action 206 after identifying the details and the sequence of the preceding element actions 206. Once identifying the task of each element action 206, the engineer can identify, for example, the number of times the pipe bending operation is repeated before the subperiods. These processes may be difficult for a lengthy YOGO chart 200. To improve this issue, the YOGO chart 200 uses subcharts as described below.

E. Subchart

The YOGO chart 200 of FIG. 13 describes an operation for bending the pipe at four positions. The YOGO chart 200 thus describes the pipe bending operation repeated four times. As described above, the pipe bending operation includes the seven processes: bend die selection, preclamping, close-contact placement, main clamping, bending, die release, and die return. These processes correspond to the seven consecutive subperiods with the subperiod numbers 4 to 10 on the example YOGO chart 200 of FIGS. 10 and 11.

Figures 14A, 14B:
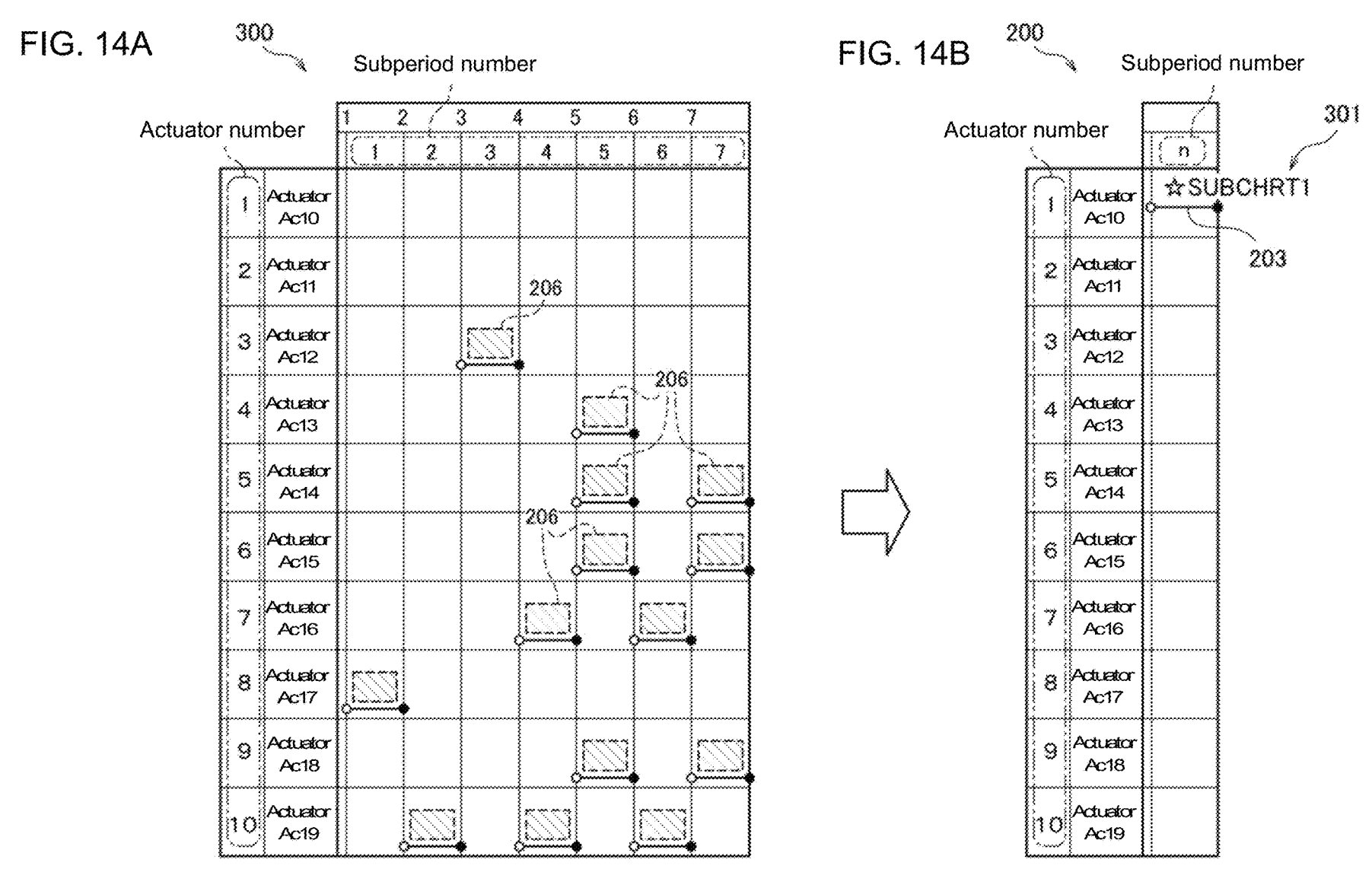

As shown in FIG. 14A, these subperiods are extracted to create a smaller chart. The smaller chart created by extracting multiple consecutive subperiods from the YOGO chart 200 is hereafter referred to as a "subchart" 300. The subchart 300 has a specific subchart identifier 301 that may be written above the action line 203 on the YOGO chart 200. In the example of FIG. 14B, the YOGO chart 200 includes the subchart identifier 301 (SUBCHRT1) written at the chart coordinates (1, n), where n is a natural number. The single subperiod with the subchart identifier 301 represents the multiple consecutive subperiods. In the present embodiment, the subchart identifier 301 corresponds to a "subchart representation" in one or more aspects of the present invention.

Figure 15:
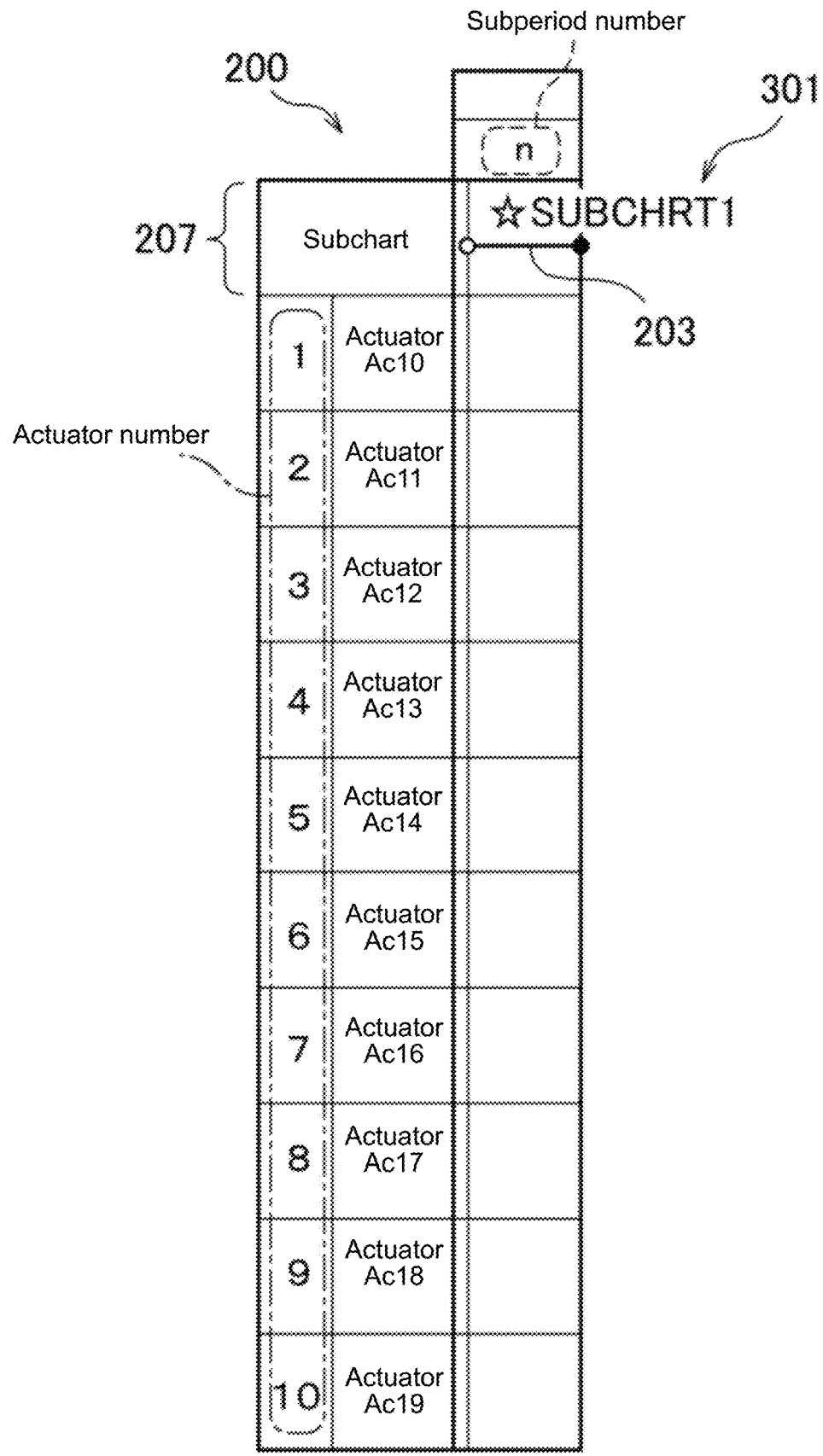
FIG. 15 is the YOGO chart 200 including a dedicated row 207 for a subchart identifier 301.

In the example of FIG. 14B, the subchart identifier 301 is written at a coordinate position with the actuator number 1. However, the subchart identifier 301 may be written at a coordinate position with any actuator number. In some embodiments, as illustrated in FIG. 15, the YOGO chart 200 may include a dedicated row 207 for the subchart identifier 301, in addition to rows (horizontal areas) assigned with actuators. The subchart identifier 301 may be written at a coordinate position in the added dedicated row 207.

The example YOGO chart 200 of FIG. 13 describes four pipe bending operations. These pipe bending operations all include the above seven processes, but select different bend dies and have different bend angles. Thus, the subchart 300 for the second pipe bending operation is different from the subchart 300 for the first pipe bending operation shown in FIG. 14A. More specifically, the subchart 300 for the second pipe bending operation is the same as the subchart 300 of FIG. 14A in the action identifier 206*a* but is different in the parameter identifiers 206*b* for each element action 206. The subchart 300 for the second pipe bending operation is associated with the subchart identifier 301 (SUBCHRT2). The subchart 300 for the third pipe bending operation is associated with the subchart identifier 301 (SUBCHRT3). The subchart 300 for the fourth pipe bending operation is associated with the subchart identifier 301 (SUBCHRT4).

Figure 16:
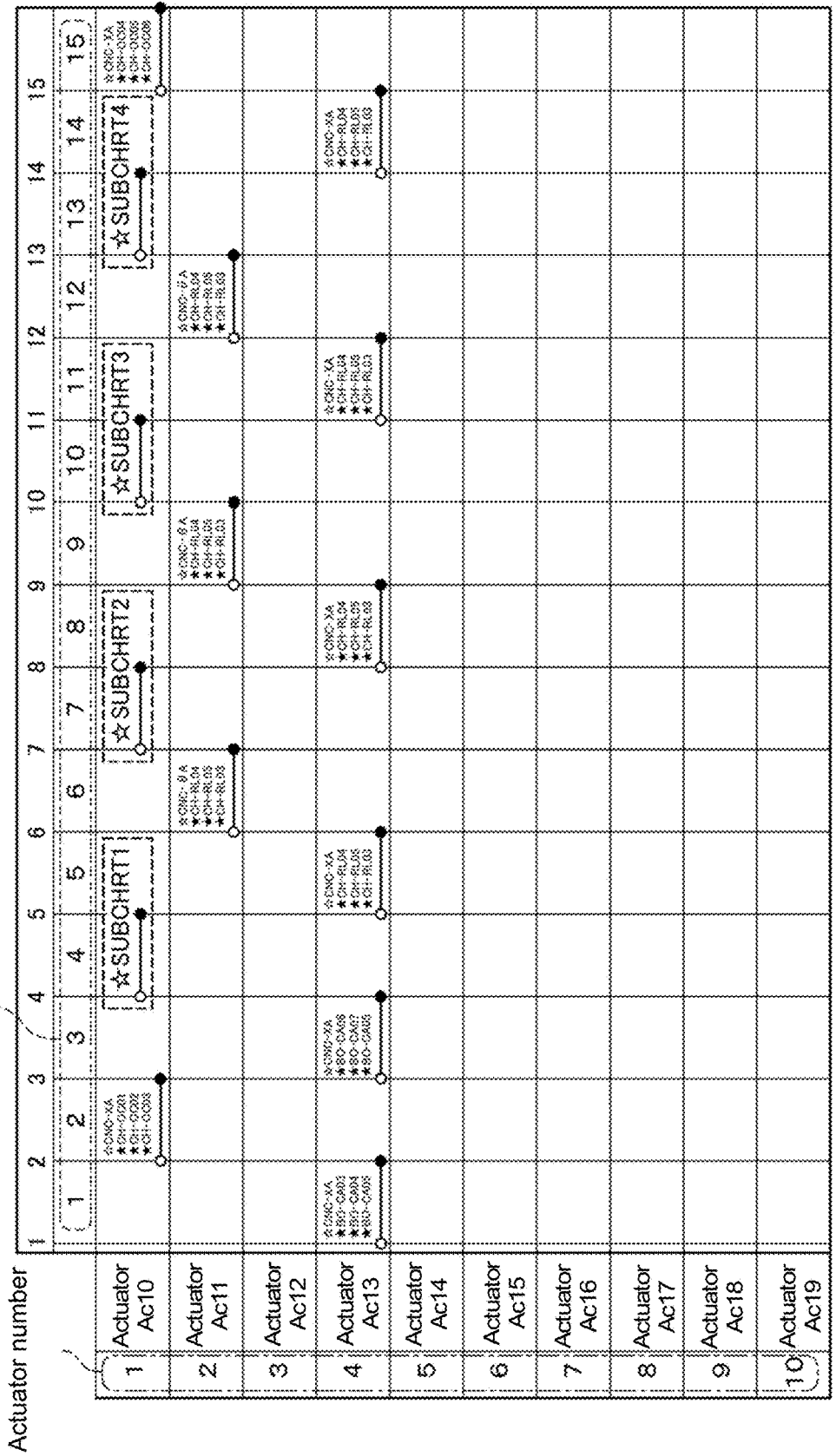
FIG. 16 is the entire YOGO chart 200 using subchart identifiers 301.

FIG. 16 is an example YOGO chart 200 corresponding to the YOGO chart 200 of FIG. 13 but created using the subchart identifiers 301. The figure includes the subchart identifiers 301 enclosed by dashed boxes. As compared with the YOGO chart 200 of FIG. 13, the YOGO chart 200 of FIG. 16 with the subchart identifiers 301 is shorter and more easily viewable entirely.

Each subchart identifier 301 corresponds to a set of multiple subperiods assigned with a group of processes to achieve a specific operation (a pipe bending operation in this example), rather than merely consecutive subperiods. The YOGO chart 200 with the subchart identifier 301 is thus easy to understand. For example, the YOGO chart 200 of FIG. 16 describes four subchart identifiers 301. This allows the engineer to easily learn that the pipe bending operation is performed four times and that, between the pipe bending operations, the conveyor unit 12 is moved by the actuator Ac13 and the pipe is twisted by the actuator Ac11.

The YOGO chart 200 created using the subchart identifier 301 is easily viewable entirely and easy to read. This facilitates creation of the YOGO chart 200 for an automated manufacturing machine with a complex operation.

In the above example, each subchart 300 corresponds to a set of seven subperiods for the seven processes included in the pipe bending operation, or specifically bend die selection, preclamping, close-contact placement, main clamping, bending, die release, and die return. The pipe bending operation is actually preceded by moving the pipe forward to the bending position and twisting the pipe in accordance with the pipe bending direction. These processes may also be added to the set of processes in each subchart 300.

F. Control Program Generation Apparatus 110

Once the YOGO chart 200 and the subchart 300 described above are created, these charts can be read by the control program generation apparatus 110 (refer to FIG. 2) included in the control apparatus 100 to automatically generate the control program for the pipe bender 10.

F-1. Overview of Control Apparatus 100 and Control Program Generation Apparatus 110

Figure 17:
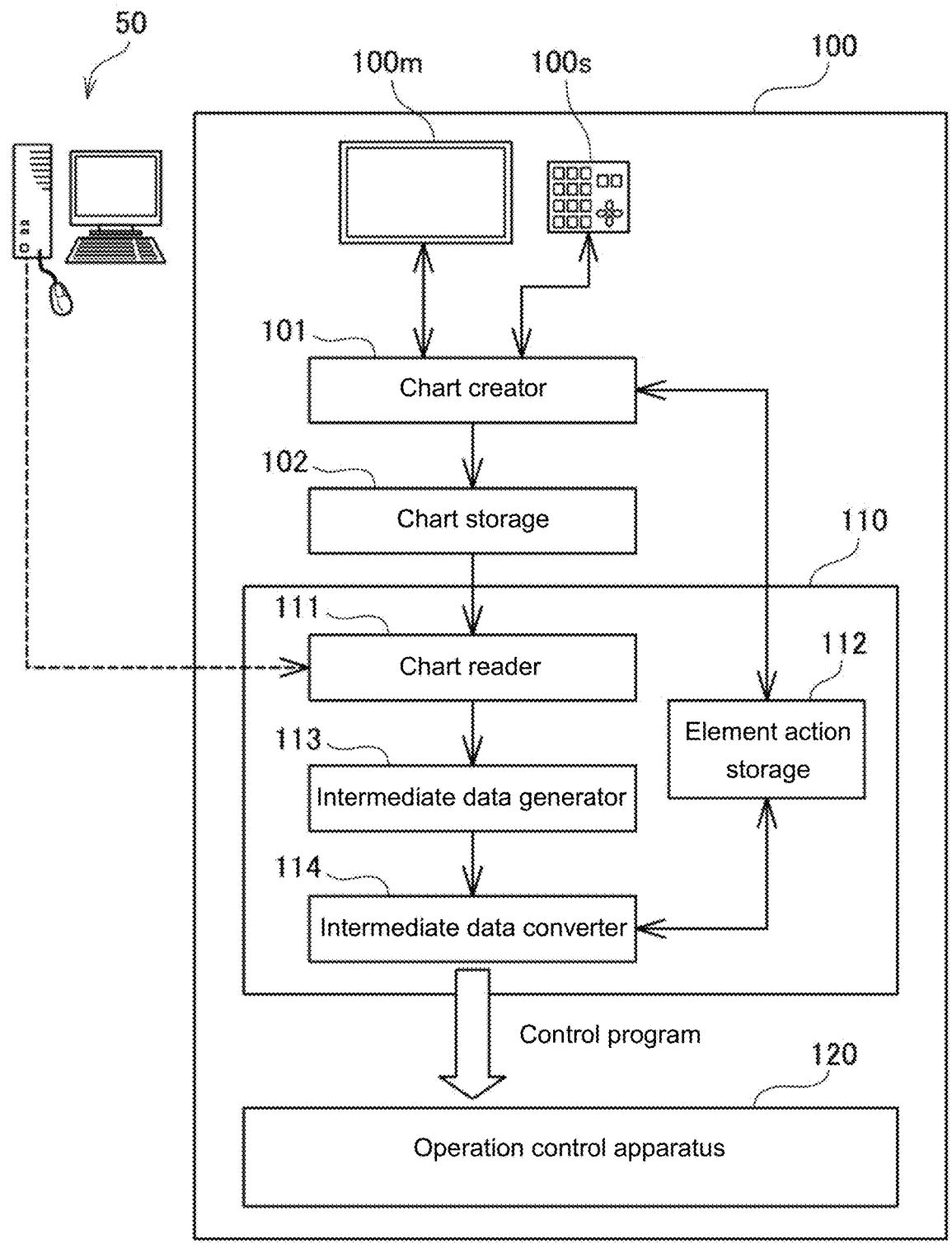
FIG. 17 is a diagram of a control program generation apparatus 110 included in the control apparatus 100.

FIG. 17 is a diagram of the control apparatus 100 incorporating the control program generation apparatus 110. As illustrated, the control apparatus 100 includes a chart creator 101, a chart storage 102, the control program generation apparatus 110, and an operation control apparatus 120. The control program generation apparatus 110 further includes a chart reader 111, an element action storage 112, an intermediate data generator 113, and an intermediate data converter 114. These units are conceptual representations of functions to be included in the control apparatus 100 to create and store the YOGO chart 200 and the subchart 300, and functions to be included in the control program generation apparatus 110 to generate the control program by reading the YOGO chart 200 and the subchart 300. The control apparatus 100 and the control program generation apparatus 110 thus may not be combinations of components corresponding to these units. These units can be implemented in various forms, such as a program executable by a central processing unit (CPU), an electronic circuit combining an integrated circuit (IC) chips and large-scale integration (LSI) circuits, or a combination of these.

The chart creator 101 is connected to, for example, a monitor screen 100m and operation buttons 100s. For example, a mechanical engineer with sufficient knowledge about the automated manufacturing machine, such as the pipe bender 10, creates the subchart 300 of FIG. 14A and the YOGO chart 200 of FIG. 16 by using the operation buttons 100s while viewing the monitor screen 100m. Any engineer with sufficient knowledge about the operation of the automated manufacturing machine can easily create the subchart 300 and the YOGO chart 200.

In the present embodiment, the element actions 206 are written on the YOGO chart basically using the action identifiers 206a and the parameter identifiers 206b. The action identifiers 206a, the parameter identifiers 206b, and parameter values corresponding to the parameter identifiers 206b are stored in the element action storage 112. The chart creator 101 refers to the element action storage 112 to write the element actions 206 on the subchart 300 and the YOGO chart 200. The complete subchart 300 and the complete YOGO chart 200 are stored in the chart storage 102.

The chart reader 111 in the control program generation apparatus 110 reads the YOGO chart 200 and the subchart 300 stored in the chart storage 102 and outputs these charts to the intermediate data generator 113. The intermediate data generator 113 analyzes the read YOGO chart 200 and the read subchart 300 to generate intermediate data (described later), and outputs the intermediate data to the intermediate data converter 114. The process for generating the intermediate data from the YOGO chart will be described in detail later. In some embodiments, the chart reader 111 may read the YOGO chart 200 and the subchart 300 from a computer 50 separated from the control apparatus 100, instead of reading them from the chart storage 102.

Upon receiving the intermediate data, the intermediate data converter 114 refers to the element action storage 112 to generate the control program from the intermediate data. The process for generating the control program from the intermediate data will be described in detail later. The intermediate data converter 114 then outputs the resultant control program to the operation control apparatus 120 (described later). In the present embodiment, the intermediate data generator 113 and the intermediate data converter 114 correspond to a control program generator in one or more aspects of the present invention.

F-2. Control Program Generation Process

Figure 18:
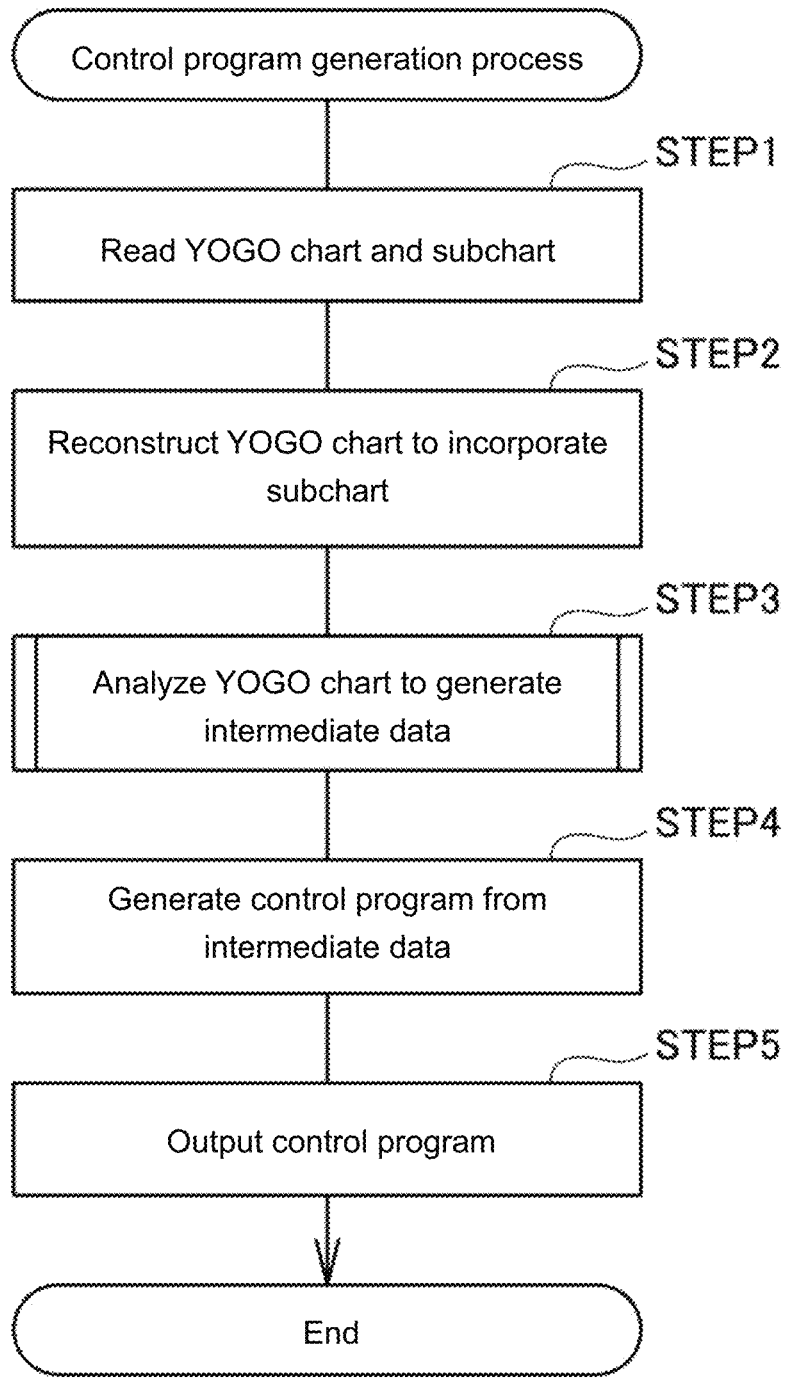
FIG. 18 is a flowchart of a control program generation process for generating the control program from the YOGO chart 200 performed by the control program generation apparatus 110.

FIG. 18 is a flowchart showing the overview of the control program generation process performed by the above control program generation apparatus 110. In the control program generation process, as shown in the figure, the YOGO chart and the subchart 300 are read first (STEP 1). The YOGO chart 200 is then reconstructed to incorporate the subchart 300 (STEP 2). More specifically, the YOGO chart 200 including the subchart identifier 301 is reconstructed into the YOGO chart 200 without including the subchart identifier 301.

Figures 19A, 19B:
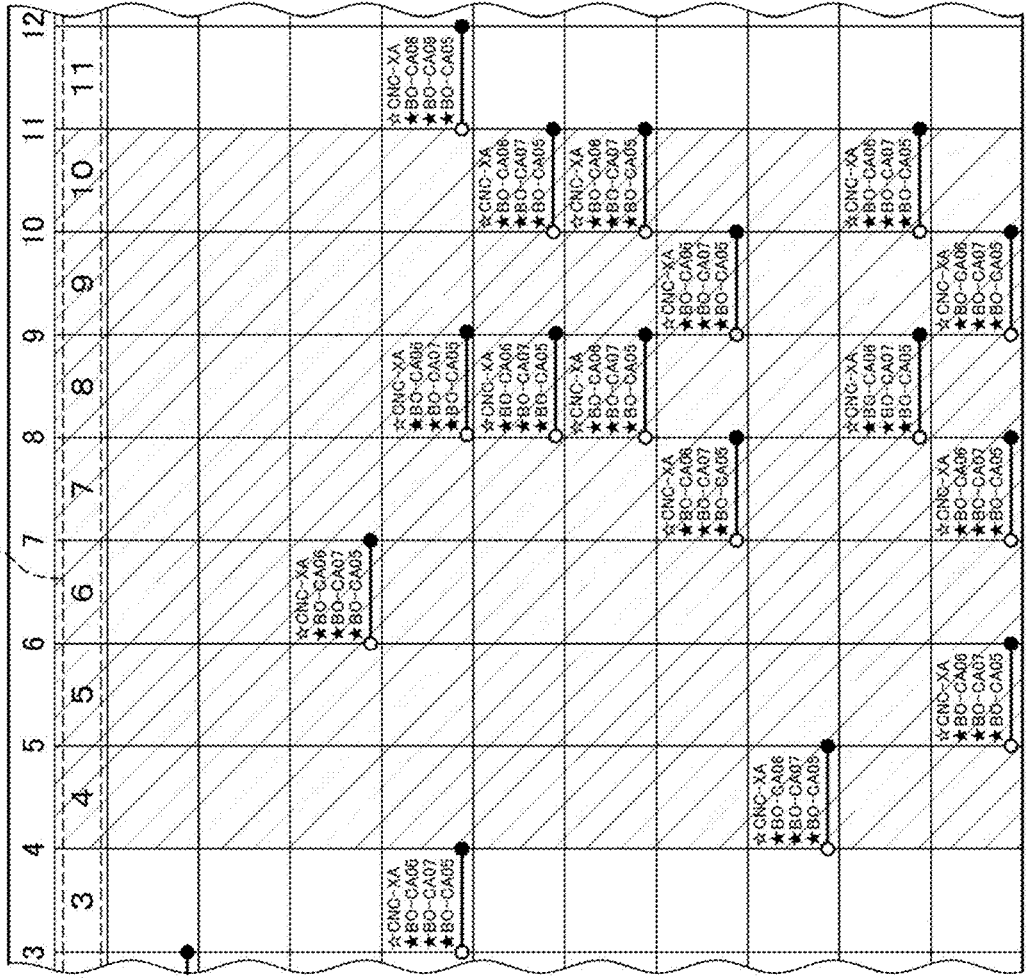
FIGS. 19A and 19B are diagrams showing reconstructing the YOGO chart 200 to incorporate the subchart 300.

FIGS. 19A and 19B are diagrams showing reconstructing the YOGO chart 200 including the subchart identifier 301 into the YOGO chart 200 without including the subchart identifier 301. FIG. 19A shows a part of the YOGO chart 200 including the subchart identifier 301 in the subperiod with the subperiod number 4. The subperiod with the subchart identifier 301 (the hatched subperiod in the figure) is replaced with the subchart 300 indicated by the subchart identifier 301, and the subperiods are then renumbered. This produces the YOGO chart 200 of FIG. 19B. For the YOGO chart 200 of FIG. 16 above, this operation is performed for each of the four subperiods with the subchart identifiers 301. This converts the YOGO chart 200 of FIG. 16 including the subchart identifiers 301 into the YOGO chart 200 of FIG. 13 without including the subchart identifiers 301. The above process is performed in STEP 2 in FIG. 18.

Figure 20:
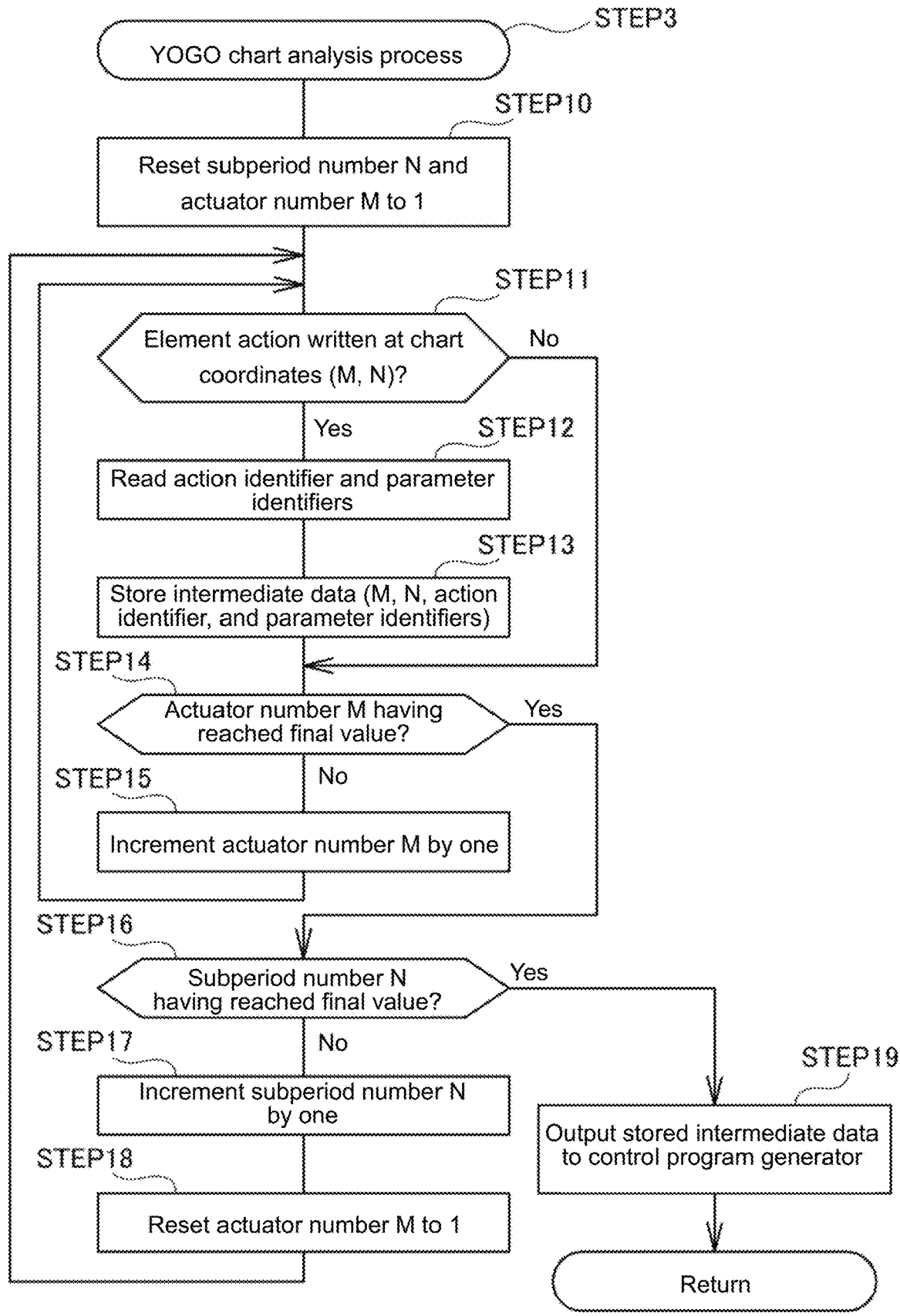
FIG. 20 is a flowchart of a YOGO chart analysis process performed in the control program generation process.

The YOGO chart 200 without including the subchart identifiers 301 obtained as described above is then analyzed to generate intermediate data (STEP 3). FIG. 20 is a flowchart of the process for analyzing the YOGO chart to generate intermediate data (YOGO chart analysis process). This process is performed by the intermediate data generator 113 in the control program generation apparatus 110.

As shown in FIG. 20, in the YOGO chart analysis process, the subperiod number N and the actuator number M are first each reset to 1 (STEP 10). The determination is performed as to whether an element action is written at the chart coordinates (M, N) on the YOGO chart (STEP 11). Immediately after STEP 10 in which the subperiod number N and the actuator number M are reset, N and M are both 1. Thus, the determination is performed as to whether an element action is written at the chart coordinates (1, 1) on the YOGO chart.

For the example YOGO chart 200 of FIG. 10, no element action is written at the chart coordinates (1, 1), and the determination result in STEP 11 is negative. The determination is then performed as to whether the actuator number M has reached the final value (STEP 14). The final value for the actuator number M is 10, with the ten actuators Ac10 to Ac19 being included in the pipe bender 10 in the present embodiment. For the determination in STEP 14 as to whether an element action is written at the chart coordinates (1, 1), the determination result is negative. The actuator number M is then incremented by one (STEP 15). The actuator number M after the increment is used to determine again whether an element action is written at the chart coordinates (M, N) (STEP 11).

For every increment, by one, of the actuator number M with the subperiod number N fixed to 1, the determination is performed as to whether an element action is written at the chart coordinates (M, 1) in the above manner. In response to the chart coordinates (M, 1) with a written element action being reached, the determination result in STEP 11 is affirmative.

In response to the determination result in STEP 11 being affirmative, the action identifier 206a and the parameter identifiers 206b of the element action written at the chart coordinates are read (STEP 12). For the example YOGO chart of FIG. 10, in response to the chart coordinates (4, 1) being reached, the determination result in STEP 11 is affirmative. This causes the action identifier 206a and the parameter identifiers 206b of the element action 206 written at the chart coordinates (4, 1) to be read. As described above with reference to FIG. 12A, the element action 206 at the chart coordinates (4, 1) has the action identifier 206a (CNC-XA) and the three parameter identifiers 206b (BO-CA03, BO-CA04, and BO-CA05). These four identifiers are thus read.

Data is then stored into a memory (STEP 13). The data includes the chart coordinates (M, N), the action identifier 206a, and the parameter identifiers 206b for the read element action 206. The data is hereafter referred to as "intermediate data" (M, N, the action identifier, and the parameter identifiers). For the chart coordinates (4, 1) on the example YOGO chart of FIG. 10, the intermediate data (4, 1, CNC-XA, BO-CA03, BO-CA04, BO-CA05) is stored into the memory.

After the intermediate data read from the YOGO chart is stored into the memory (STEP 13), the determination is performed as to whether the actuator number M has reached the final value (10 in this example) (STEP 14). In response to the actuator number M being yet to reach the final value (no in STEP 14), the actuator number M is incremented by one (STEP 15), and the process returns to STEP 11 to determine again whether an element action is written at the chart coordinates (M, N) on the YOGO chart.

In response to the actuator number M reaching the final value (yes in STEP 14), the determination is performed as to whether the subperiod number N has reached a final value (STEP 16). For the YOGO chart describing the operation of the pipe bender 10 using 100 subperiods, for example, the subperiod number N has a final value of 100.

In response to the subperiod number N being yet to reach the final value (no in STEP 16), the subperiod number N is incremented by one (STEP 17), the actuator number M is reset to 1 (STEP 18), and the process returns to STEP 11 to determine again whether an element action is written at the chart coordinates (M, N) on the YOGO chart. More specifically, the determination is performed for the subperiod with the subperiod number N being 1 from top to bottom on the YOGO chart 200 of FIG. 10, then for the subperiod with the subperiod number N being 2 from top, and then for the subperiod with the subperiod number N being 3. In this manner, the element actions written on the YOGO chart are read in sequence from the subperiod with a lower subperiod number N to the subperiod with a higher subperiod number N. The read element actions are stored as intermediate data into the memory.

In response to the subperiod number N finally being determined to have reached the final value (yes in STEP 16) after the repeated processes above, the element actions written on the YOGO chart have been all read. The intermediate data stored in the memory is then read and output to the intermediate data converter 114 (refer to FIG. 17) (STEP 19).

FIG. 21 illustrates the intermediate data resulting from analyzing the example YOGO chart of FIG. 10. As illustrated, the intermediate data is a collection of datasets (hereafter, data records) each including the actuator number M, the subperiod number N, the action identifier 206a, and the parameter identifiers 206b listed in this order. The subperiod number N in each data record can take any value from 1 to the final value of the subperiod number N. The actuator number M can take any actuator number written on the YOGO chart. Every subperiod number N on the YOGO chart is included in any data record. Every actuator number M on the YOGO chart is included in any data record. In response to the intermediate data being output, the YOGO chart analysis process in FIG. 20 is complete, and the process returns to the control program generation process in FIG. 18.

In the control program generation process shown in FIG. 18, the control program is generated based on the intermediate data obtained as described above (STEP 4). FIG. 22 shows the control program generated from the intermediate data illustrated in FIG. 21. As illustrated, the control program is a collection of datasets (hereafter, data records) each including the actuator number M, the subperiod number N, a program element number P, and parameter values V listed in this order. The comparison between the intermediate data in FIG. 21 and the control program in FIG. 22 shows that the data records in the control program correspond to the data records in the intermediate data. However, the action identifiers 206a in the data records in the intermediate data are replaced with the program element numbers P corresponding to the action identifiers 206a (refer to FIG. 5). The parameter identifiers 206b in the data records in the intermediate data are replaced with the parameter values V corresponding to the parameter identifiers 206b (refer to FIGS. 7A to 7E).

This conversion from the immediate data to the control program is performed by the intermediate data converter 114 in FIG. 17 referring to the element action storage 112. The element action storage 112 stores the action identifiers 206a and the program element numbers in a manner associated with each other (refer to FIG. 5). As illustrated in FIGS. 7A to 7E, the element action storage 112 also stores the parameter identifiers 206b and the parameter values V defined for the parameter identifiers 206b in a manner associated with each other. The intermediate data converter 114 refers to these pieces of data and replaces the action identifiers 206a and the parameter identifiers 206b in the intermediate data with the program element numbers P and the parameter values V.

In response to the control program being generated from the intermediate data (STEP 4 in FIG. 18), the generated control program is output to the operation control apparatus 120 included in the control apparatus 100 (STEP 5). This completes the control program generation process in FIG. 18.

E. Overview of Operation of Operation Control Apparatus 120

The operation control apparatus 120 in the control apparatus 100 receives the control program and controls the operation of the pipe bender 10 in the manner described below. The operation is described using the control program shown in FIG. 22. The operation control apparatus 120 first extracts, from the records in the control program, the record with the subperiod number N being 1. In the control program in FIG. 22, the record (4, 1, 1, 25, 120, 100) is extracted. The first number in the record is the actuator number. The third number in the record is the program element number. The fourth to sixth numbers in the record are the parameter values V specified for the program element. The operation control apparatus 120 causes the actuator identified by the actuator number to act in accordance with the information specified by the parameter values V (specifically, the movement distance, the movement speed, and the movement torque) using the program element identified by the program element number.

Upon completion of the action in accordance with the specified information, the subperiod number N is incremented by one. The record with the incremented subperiod number (2 in this example) is then extracted from the control program. In the control program in FIG. 22, the record (1, 2, 1, 60, 20, 100) is extracted. Thus, the program element with the program element number 1 is used to cause the actuator with the actuator number 1 to act in accordance with the information specified by the parameter values V. Upon completion of the action in accordance with the specified information, the subperiod number N is incremented by one again. The record with the incremented subperiod number is then extracted to cause the actuator to act in accordance with the record.

Multiple records with the subperiod number N may be extracted from the control program. In the example of FIG. 22, multiple records are extracted for the subperiod numbers 7, 8, and 9. In this case, the multiple actuators act at the same time in accordance with the respective records. Upon completion of the actions of all the actuators, the subperiod number N is incremented by one again. The record with the incremented subperiod number is then extracted. Repeating this operation allows the pipe bender 10 to operate.

As described in detail above, the YOGO chart 200 describing the operation of the pipe bender 10 can be used to automatically generate the control program for operating the pipe bender 10. A large YOGO chart 200 that may be difficult to view entirely can be more easily viewable entirely by using the subchart identifier 301 for a set of multiple consecutive subperiods on the YOGO chart 200. The subchart identifier 301 corresponds to a set of multiple subperiods assigned with a group of processes to achieve a specific operation (e.g., a pipe bending operation), rather than merely consecutive subperiods. The YOGO chart 200 with the subchart identifier 301 is thus easy to understand.

F. Modifications

The above embodiment may be modified variously. The modifications will be described below focusing on their differences from the above embodiment.

F-1. First Modification

In the above embodiment, different subcharts 300 with different subchart identifiers 301 are used when the subcharts 300 are not exactly the same in the information in their multiple subperiods, including the parameter identifiers 206b of the element actions 206. For example, the YOGO chart 200 of FIG. 13 includes the four pipe bending operations with different bend radii and different bend angles. These pipe bending operations are described in different subcharts 300 with different subchart identifiers 301 (refer to FIG. 16).

In some embodiments, a common subchart 300 may be used for multiple subcharts 300 that differ from each other merely in one or more of the parameter identifiers 206b of the element actions 206. Such a subchart 300 in a first modification will now be described with reference to the subchart 300 of FIG. 14A describing the pipe bending operation as an example.

As described above, the subchart 300 of FIG. 14A includes seven consecutive subperiods corresponding to the seven processes included in the pipe bending operation, or specifically bend die selection, preclamping, close-contact placement, main clamping, bending, die release, and die return. The bend die selection refers to the process for raising or lowering the machining unit 13 to select a bend die in accordance with the bend radius of the pipe. The preclamping refers to the process for moving the clamp die toward the bend die to hold the pipe loosely. The close-contact placement refers to the process for moving the chuck 12b horizontally to place the pipe in close contact with the bend die. The main clamping refers to the process for placing the pressure die in close contact with the pipe. The bending refers to the process for bending the pipe by moving the clamp die about the rotation axis of the bend die. The die release refers to the process for separating, from the pipe, the pressure die and the clamp die holding the pipe. The die return refers to the process for returning the clamp die moved about the rotation axis of the bend die to the original position.

For pipes with different bend radii, different bend dies are used. Thus, the machining unit 13 moves to different positions in the bend die selection, and each of the clamp die and the pressure die moves by different distances in the preclamping, the close-contact placement, the main clamping, the die release, and the die return. However, the parameters such as the movement speed and the movement torque may be the same for pipes with different bend radii. For pipes with different bend angles, the clamp die is moved by different angles about the rotation axis of the bend die in the bending. Thus, the chuck moves forward by different distances, and the electrical cables are loosened by different degrees. However, the parameters such as the movement speed and the movement torque may be the same. The YOGO chart 200 of FIG. 16 includes the four subchart identifiers 301 (SUBCHRT1, SUBCHRT2, SUBCHRT3, and SUBCHRT4), for which four subcharts 300 may be prepared. The four subcharts 300 differ from one another merely in one or more of the parameter identifiers 206b of the element actions 206.

In the first modification, a common parameter identifier 206b is used instead of different parameter identifiers 206b for different subcharts 300. For the common parameter identifier 206b, a different parameter value V is read for each reading operation. More specifically, the common parameter identifier 206b has its parameter value V switchable for each reading operation, whereas the other parameter identifiers 206b have the specific parameter values V included in the tables B of, for example, FIGS. 7A to 7E.

Figure 23:
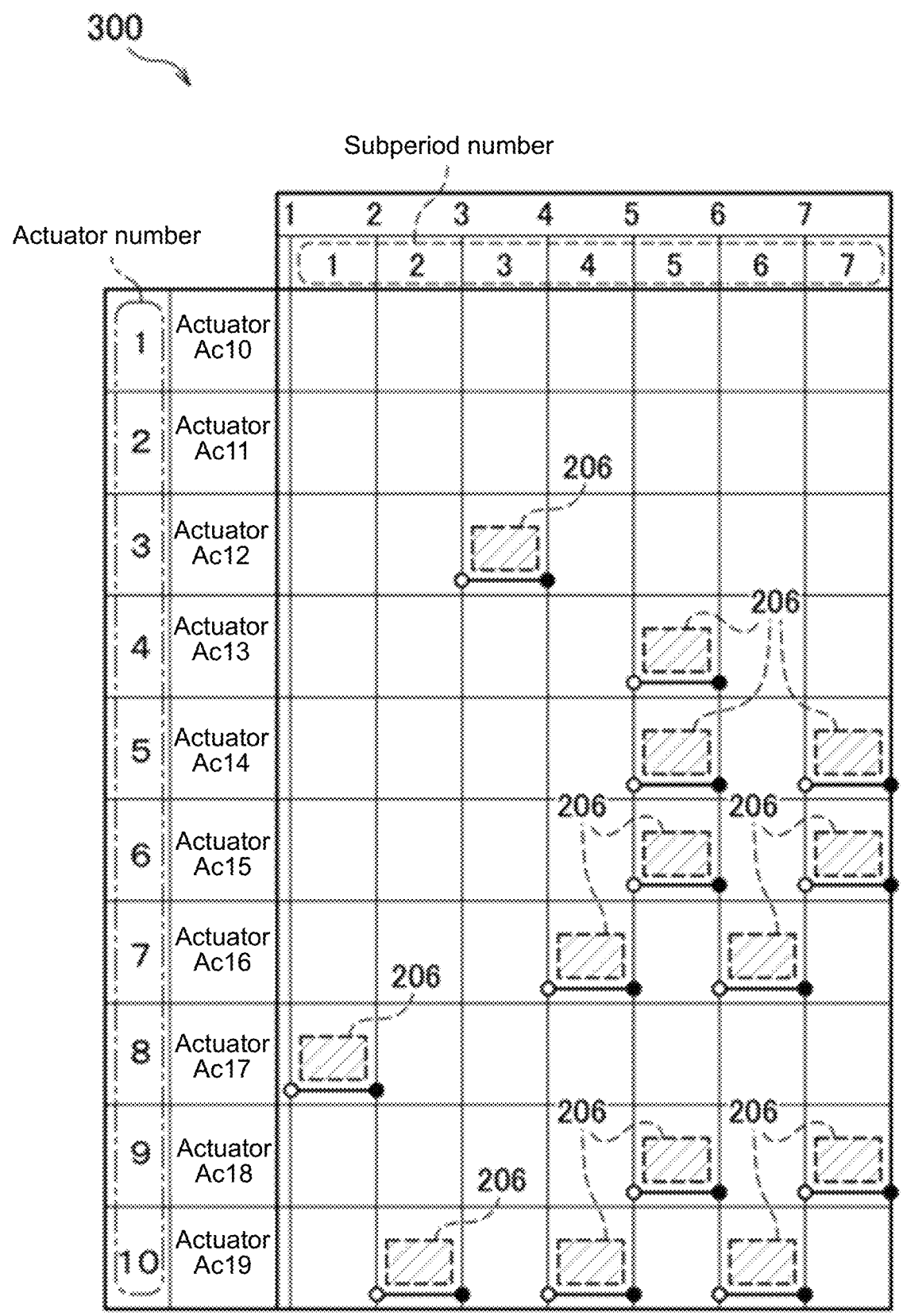
FIG. 23 is an example subchart 300 in a first modification.

FIG. 23 is an example subchart 300 in the first modification. The second subchart 300 in the first modification differs from the subchart 300 of FIG. 14A in one or more of the parameter identifiers 206b of the element actions 206. FIGS. 24A to 24N are diagrams showing the element actions 206 written on the subchart 300 in the first modification.

FIG. 24A shows the element action 206 written at the chart coordinates (8, 1) on the subchart 300 of FIG. 23. This element action 206 is for moving the machining unit 13 to select the bend die and corresponds to the element action 206 shown in FIG. 12D on the YOGO chart 200 described above with reference to FIGS. 10 and 11. As compared with the element action 206 in FIG. 12D, the element action 206 in the first modification shown in FIG. 24A has a parameter identifier 206d (KL-KR-X) at the top to indicate the movement distance, instead of the parameter identifier 206b (KL-KX01). The parameter identifier 206d includes "-X" at the end indicating that the parameter identifier 206d has a different parameter value V for each reading operation. In FIG. 24A, the parameter identifier 206d is enclosed by a dashed box for highlighting.

FIG. 24B shows the element action 206 written at the chart coordinates (10, 2) on the subchart 300 of FIG. 23. This element action 206 is for preclamping the pipe with the clamp die and corresponds to the element action 206 shown in FIG. 12E on the YOGO chart 200 described above with reference to FIGS. 10 and 11. As compared with the element action 206 in FIG. 12E, the element action 206 in FIG. 24B has the parameter identifier 206d (CL-SP-X) at the top to indicate the movement distance of the clamp die, instead of the parameter identifier 206b (CL-SE04). The parameter identifier 206d has a different parameter value V for each reading operation. In FIG. 24B as well, the parameter identifier 206d is enclosed by a dashed box.

The same applies to the other element actions. More specifically, the element action 206 written at the chart coordinates (3, 3) on the subchart 300 of FIG. 23 has the parameter identifier 206d at the top instead of the parameter identifier 206b (refer to FIG. 24C). The element action 206 written at the chart coordinates (7, 4) has the parameter identifier 206d at the top instead of the parameter identifier 206b (refer to FIG. 24D). The element actions 206 written at the chart coordinates (10, 4), (4, 5), (5, 5), (6, 5), (9, 5), (7, 6), (10, 6), (5, 7), (6, 7), and (9, 7) each have the parameter identifier 206d at the top instead of the parameter identifier 206b (refer to FIGS. 24E to 24N). These parameter identifiers 206d have the parameter values V defined as described below.

FIG. 25 is an example table including the parameter values V defined for the parameter identifiers 206d in the first modification. As described above with reference to FIGS. 24A to 24N, the subchart 300 in the first modification includes 14 parameter identifiers 206d each having four parameter values V. Each parameter identifier 206d has the four parameter values V because the subchart 300 of FIG. 23 is to be used four times in the YOGO chart 200 to describe bending the pipe at four positions. The table of FIG. 25, referred to as a "table C", includes the parameter identifiers 206d in the modification each having multiple parameter values V.

In the first modification described above, a single subchart 300 may be prepared for an increased number of pipe bending operations to be performed. This further facilitates creation of the YOGO chart 200.

F-2. Second Modification

The YOGO chart 200 may include a conditional subchart representation 302, instead of the subchart identifier 301. The conditional subchart representation 302 combines the subchart identifier 301 and a selection condition for selecting the subchart identifier 301.

FIGS. 26A to 26D are diagrams showing the conditional subchart representation 302 on a YOGO chart 200 in a second modification. As shown in FIG. 26A, the conditional subchart representation 302 is written above the action line 203, similarly to the above subchart identifier 301. The conditional subchart representation 302 includes at least one subchart identifier 301 and a selection condition 303 for selecting the subchart identifier 301. FIGS. 26B to 26D show other examples of conditional subchart representations 302.

The conditional subchart representation 302 illustrated in FIG. 26B includes two subchart identifiers 301 (SUBCHRT1 and SUBCHRT2) and the selection condition 303 (SW1). The selection condition 303 (SW1) indicates selecting SUBCHRT1 for a switch SW1 being ON, and selecting SUBCHRT2 for the switch SW1 being OFF. The subchart 300 may be pre-created for each of the subchart identifiers 301 (SUBCHRT1 and SUBCHRT2). The subcharts 300 may include different numbers of subperiods. The conditional subchart representation 302 may include more or less than two subchart identifiers 301.

The conditional subchart representation 302 illustrated in FIG. 26C includes three subchart identifiers 301 (SUBCHRT1, SUBCHRT2, and SUBCHRT3) and the selection condition 303 (VALUE). The selection condition 303 (VALUE) indicates selecting SUBCHRT1 for a function value VALUE being 0, selecting SUBCHRT2 for the value being 1, and selecting SUBCHRT3 for the value being 2. The subcharts 300 may be pre-created for the respective subchart identifiers 301. The subcharts 300 may include different numbers of subperiods.

The conditional subchart representation 302 illustrated in FIG. 26D includes one subchart identifier 301 (SUBCHRT1) and the selection condition 303 (IF(A)). The selection condition 303 (IF(A)) indicates selecting SUBCHRT1 for a condition A being satisfied, and skipping the corresponding subperiod without selecting SUBCHRT1 for the condition A not being satisfied.

The conditional subchart representation 302 can switch actions of the actuators flexibly in accordance with any of various conditions. The YOGO chart 200 is also easily viewable entirely and easy to create.

At the timing of generation of the control program from the YOGO chart 200 including the conditional subchart representation 302, the selection condition 303 may be already defined (the subchart identifier 301 is selectable) or may be undefined. For the selection condition 303 being already defined at the timing of generation of the control program, the YOGO chart 200 is reconstructed not to include the subchart identifiers 301, and the resultant YOGO chart 200 is used to generate the control program as described above with reference to FIGS. 19A and 19B. For the selection condition 303 being undefined at the timing of generation of the control program, the control program is generated in the manner described below.

In the example of FIG. 27A, the YOGO chart 200 includes the conditional subchart representation 302 assigned to the subperiod with the subperiod number 4. The conditional subchart representation 302 indicates selecting the subchart 300 (SUBCHRT1) or the subchart 300 (SUB-CHRT2) depending on the state of the switch SW1 as illustrated in FIG. 27B. The subchart 300 (SUBCHRT1) is shown in FIG. 27C. The subchart 300 (SUBCHRT2) is shown in FIG. 27D.

For the switch SW1 with an undefined state at the timing of generation of the control program, the subcharts 300 (SUBCHRT1 and SUBCHRT2) are converted into intermediate data (refer to FIG. 21). The intermediate data is then converted into the control program (refer to FIG. 22), which is then stored. The control program resulting from conversion of the subcharts 300 alone is referred to as a "subcontrol program" 304. In the present embodiment, the subcontrol program 304 corresponds to a "subcontrol program" in one or more aspects of the present invention.

The control program is generated for the subperiods excluding the subperiod assigned with the conditional subchart representation 302 on the YOGO chart 200. For the YOGO chart 200 of FIG. 27A, the control program is generated for the subperiods with the subperiod numbers 1 to 3, 5, and subsequent numbers, excluding the subperiod with the subperiod number 4 assigned with the conditional subchart representation 302. The subperiod with the subperiod number 4 has a jump instruction for jumping to and executing the subcontrol program 304 for SUBCHRT1 or SUBCHRT2 selected in accordance with the state of the switch SW1. Upon completion of the subcontrol program 304, the processing may return to the subperiod with the subperiod number 5 and resume executing the control program.

Figure 28:
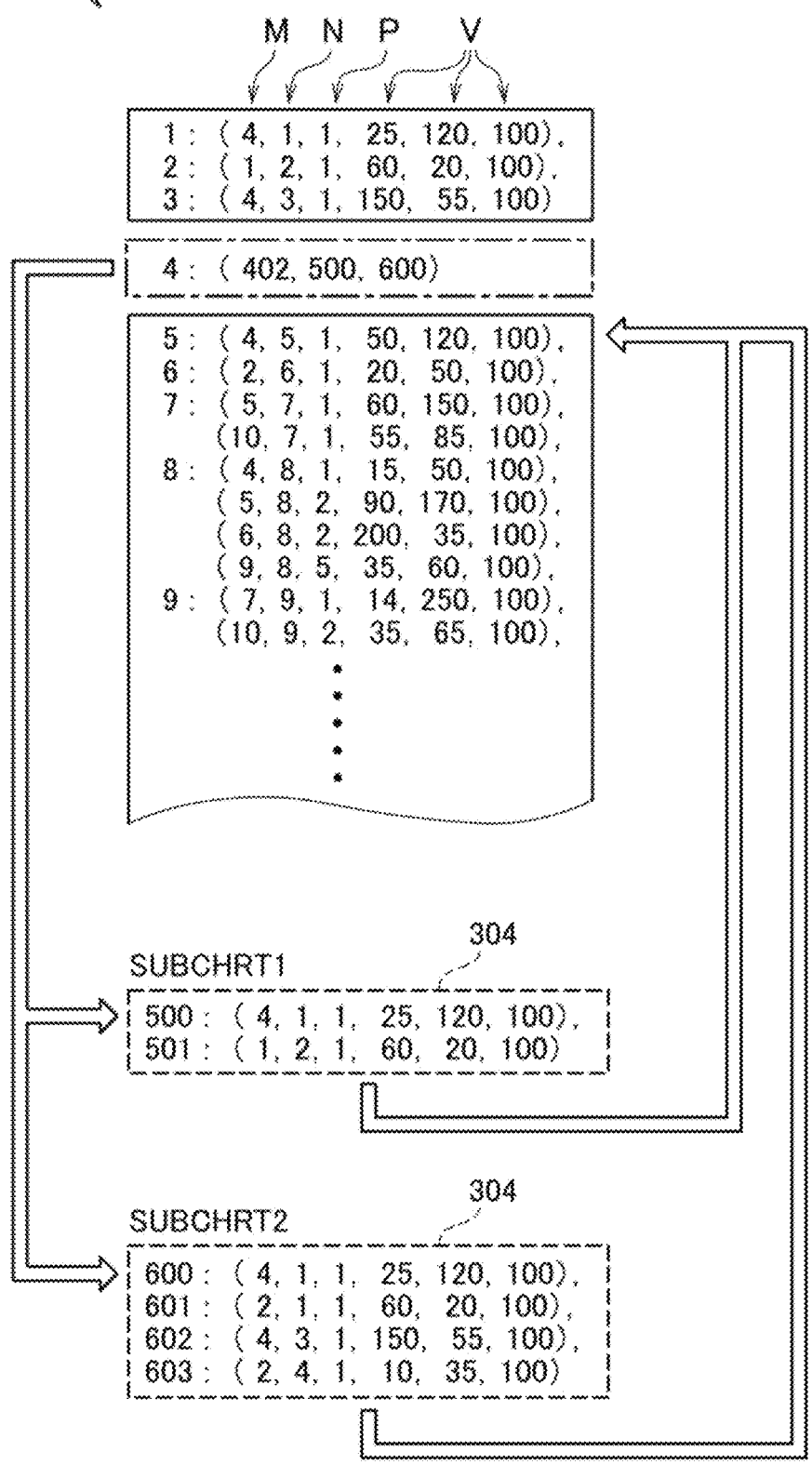
FIG. 28 is an example control program generated from the YOGO chart 200 in the second modification.

FIG. 28 shows an example control program generated in this manner. The figure includes a jump instruction 4:(402, 500, 600) enclosed by a dot-dash box. The illustrated jump instruction indicates jumping to the subcontrol program 304 with an address beginning with 500 or 600 in accordance with the state of the switch indicated by 402 (the switch SW1 in this example) for the subperiod with the subperiod number 4, and indicates resuming execution of the control program from the subperiod with the subperiod number 5.

Thus, for the selection condition 303 being undefined at the timing of generation of the control program, the control program can be generated from the YOGO chart 200 including the conditional subchart representation 302.

The control program generation apparatus 110 according to the present embodiment and the modifications have been described. However, the present invention is not limited to the above embodiment and modifications and may be implemented in various manners without departing from the spirit and scope of the invention.

In the example of FIGS. 19A and 19B, the YOGO chart 200 includes the subchart identifier 301 that is used to read the subchart 300 from the YOGO chart 200. In some embodiments, the subchart 300 may include another subchart identifier 301 that is used to read another subchart 300 from the subchart 300.

For a subchart identifier 301 being repeatedly written on the YOGO chart 200, the subchart identifier 301 may include the number of repetitions. In the example of FIG. 29A, the subchart identifier 301 (SUBCHRT1) is written in each of three consecutive subperiods on the YOGO chart 200. In this case, as illustrated in FIG. 29B, the subchart identifier 301 with the number of repetitions (SUBCHRT1(3)) may be written to indicate repeating the subchart identifier 301 (SUBCHRT1) three times.

REFERENCE SIGNS LIST 10 pipe bender
11 rail
12 conveyor unit
12a holder shaft
12b chuck
13 machining unit
50 computer
100 control apparatus
100m monitor screen
100s operation button
101 chart creator
102 chart storage
110 control program generation apparatus
111 chart reader
112 element action storage
113 intermediate data generator
114 intermediate data converter
120 operation control apparatus
201 separation line
202 trigger line
203 action line
204 start point
205 end point
206 element action
206a action identifier
206b parameter identifier
206c table identifier
206d parameter identifier
207 dedicated row
300 subchart
301 subchart identifier
302 conditional subchart representation
303 selection condition
304 subcontrol program
Ac10 to Ac19 actuator
DA10 to DA19 driver amplifier

The invention claimed is:

1. A control program generation apparatus that generates, with a computer, a control program for an automated manufacturing machine including a plurality of actuators, the apparatus comprising:

an element action storage storing a plurality of element actions in a manner associated with a plurality of program elements to perform the plurality of element actions, each of the plurality of element actions indicating an action of a corresponding actuator of the plurality of actuators in a direction of an inherent degree of freedom of the corresponding actuator by a specified displacement;

an action chart reader configured to read an action chart describing an operation of the automated manufacturing machine, the action chart including a plurality of subperiods into which an operation period from a start to an end of the operation of the automated manufacturing machine is divided, the action chart including the plurality of element actions included in the operation of the automated manufacturing machine, each of the plurality of element actions being assigned to a subperiod of the plurality of subperiods; and a control program generator configured to generate the control program to cause the automated manufacturing machine to operate by combining together, in an order of the plurality of subperiods on the action chart, the plurality of program elements for the plurality of element actions assigned to the plurality of subperiods on the action chart, wherein the action chart reader reads, in addition to the action chart, at least one subchart corresponding to consecutive subperiods of the plurality of subperiods assigned with element actions of the plurality of element actions, the action chart includes a subchart representation assigned to at least one subperiod of the plurality of subperiods, and the subchart representation is specific to the at least one subchart, and the control program generator generates, for the at least one subperiod assigned with the subchart representation, the control program by combining together, in an order of the consecutive subperiods on the at least one subchart, program elements of the plurality of program elements for the element actions assigned to the consecutive subperiods on the at least one subchart corresponding to the subchart representation.

2. The control program generation apparatus according to claim 1, wherein the control program generator generates an action chart without including the subchart representation from the action chart including the subchart representation by replacing the at least one subperiod assigned with the subchart representation with the consecutive subperiods on the at least one subchart corresponding to the subchart representation, and generates the control program based on the generated action chart.

3. The control program generation apparatus according to claim 1, wherein the action chart includes a plurality of the subchart representations and a selection condition for selecting one of the plurality of subchart representations, and the plurality of subchart representations and the selection condition are assigned to the at least one subperiod, the action chart reader reads, in addition to the action chart, a plurality of the subcharts corresponding to the plurality of subchart representations, and the control program generator generates, for the at least one subperiod assigned with the plurality of subchart representations, the control program by combining together the program elements for the element actions assigned to the consecutive subperiods in accordance with one of the plurality of subcharts corresponding to one of the plurality of subchart representations selected based on the selection condition.

4. The control program generation apparatus according to claim 3, wherein the control program generator generates a plurality of subcontrol programs for the plurality of subcharts corresponding to the plurality of subchart representations, the control program generator generates each of the plurality of subcontrol programs by combining together, in an order of the consecutive subperiods on a corresponding subchart of the plurality of subcharts, the program elements for the element actions assigned to the consecutive subperiods on the corresponding subchart, and the control program generator generates, for the at least one subperiod assigned with the plurality of subchart representations, the control program for executing a subcontrol program selected from the plurality of subcontrol programs based on the selection condition.

5. A control program generation method that generates, with a computer, a control program for an automated manufacturing machine including a plurality of actuators, the method comprising:

reading an action chart describing an operation of the automated manufacturing machine, the action chart including a plurality of subperiods into which an operation period from a start to an end of the operation of the automated manufacturing machine is divided, the action chart including a plurality of element actions included in the operation of the automated manufacturing machine, each of the plurality of element actions indicating an action of a corresponding actuator of the plurality of actuators in a direction of an inherent degree of freedom of the corresponding actuator by a specified displacement, each of the plurality of element actions being assigned to a subperiod of the plurality of subperiods; and generating the control program to cause the automated manufacturing machine to operate by referring to a stored correspondence between the plurality of element actions on the action chart and a plurality of program elements to perform the plurality of element actions, by converting the plurality of element actions on the action chart into the plurality of program elements, and by combining together the plurality of program elements in an order of the plurality of subperiods, wherein the reading the action chart includes reading, in addition to the action chart, at least one subchart corresponding to consecutive subperiods of the plurality of subperiods assigned with element actions of the plurality of element actions, the read action chart includes a subchart representation assigned to at least one subperiod of the plurality of subperiods, and the subchart representation is specific to the at least one subchart, and the generating the control program includes generating, for the at least one subperiod assigned with the subchart representation, the control program by combining together, in an order of the consecutive subperiods on the at least one subchart, program elements of the plurality of program elements for the element actions assigned to the consecutive subperiods on the at least one subchart corresponding to the subchart representation.

6. A non-transitory computer-readable storage medium storing a program that causes a computer to implement a method for generating a control program for an automated manufacturing machine including a plurality of actuators, the method comprising:

reading an action chart describing an operation of the automated manufacturing machine, the action chart including a plurality of subperiods into which an operation period from a start to an end of the operation of the automated manufacturing machine is divided, the action chart including a plurality of element actions included in the operation of the automated manufacturing machine, each of the plurality of element actions indicating an action of a corresponding actuator of the plurality of actuators in a direction of an inherent degree of freedom of the corresponding actuator by a specified displacement, each of the plurality of element actions being assigned to a subperiod of the plurality of subperiods; and generating the control program to cause the automated manufacturing machine to operate by referring to a stored correspondence between the plurality of element actions on the action chart and a plurality of program elements to perform the plurality of element actions, by converting the plurality of element actions on the action chart into the plurality of program elements, and by combining together the plurality of program elements in an order of the plurality of subperiods, wherein the reading the action chart includes reading, in addition to the action chart, at least one subchart corresponding to consecutive subperiods of the plurality of subperiods assigned with element actions of the plurality of element actions, the read action chart includes a subchart representation assigned to at least one subperiod of the plurality of subperiods, and the subchart representation is specific to the at least one subchart, and the generating the control program includes generating, for the at least one subperiod assigned with the subchart representation, the control program by combining together, in an order of the consecutive subperiods on the at least one subchart, program elements of the plurality of program elements for the element actions assigned to the consecutive subperiods on the at least one subchart corresponding to the subchart representation.

* * * * *